US009927788B2

(12) United States Patent
Balentine et al.

(10) Patent No.: US 9,927,788 B2
(45) Date of Patent: Mar. 27, 2018

(54) SOFTWARE LOCKOUT COORDINATION BETWEEN A PROCESS CONTROL SYSTEM AND AN ASSET MANAGEMENT SYSTEM

(75) Inventors: James R. Balentine, Austin, TX (US); Andre A. Dicaire, Round Rock, TX (US); Cindy A. Scott, Georgetown, TX (US); Donald Robert Lattimer, Chaska, MN (US); Kenneth Schibler, Chesterfield, MO (US); John R. Shepard, Austin, TX (US); Larry O. Jundt, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 215 days.

(21) Appl. No.: 13/111,560

(22) Filed: May 19, 2011

(65) Prior Publication Data

US 2012/0296448 A1  Nov. 22, 2012

(51) Int. Cl.
*G05B 13/02* (2006.01)
*G05B 19/042* (2006.01)
*G05B 19/409* (2006.01)

(52) U.S. Cl.
CPC ....... *G05B 19/0426* (2013.01); *G05B 19/409* (2013.01); *G05B 2219/23008* (2013.01);
(Continued)

(58) Field of Classification Search
CPC ... G06Q 10/06; G05B 19/0426; G05B 19/409
See application file for complete search history.

(56) References Cited

U.S. PATENT DOCUMENTS 3,096,434 A   7/1963  King
3,404,264 A  10/1968  Kugler
(Continued)

FOREIGN PATENT DOCUMENTS

CN   1097804      1/1995
CN   1267373 A    9/2000
(Continued)

OTHER PUBLICATIONS

Search Report under Section 17 for corresponding Great Britain Application No. 1208679.9.
(Continued)

*Primary Examiner* — Tarek Chbouki
(74) *Attorney, Agent, or Firm* — Marshall, Gerstein & Borun LLP

(57) ABSTRACT

A process control system coordinates with an associated asset management system to implement a plant safety mechanism and, in particular, to prevent unintended changes to, or otherwise undesired operation of, one or more process control equipment resources in a process plant. A maintenance technician uses the asset management system to request access to one or more of the process control equipment resources. A process operator receives the request via the process control system and grants or denies the request. Process control equipment resources for which a process operator grants a request are inoperable, in part or in whole, by the process control system. Upon completion of the maintenance task, the maintenance technician requests to return control of the process control equipment resource to the process operator. The return is complete when the process operator acknowledges the return of the resource to the process control system.

19 Claims, 14 Drawing Sheets

(52) U.S. Cl.
CPC .............. *G05B 2219/32122* (2013.01); *G05B 2219/32152* (2013.01); *Y02P 90/14* (2015.11)

(56) References Cited

U.S. PATENT DOCUMENTS

| | | |
|---|---|---|
| 3,701,280 A | 10/1972 | Stroman |
| 3,705,516 A | 12/1972 | Reis |
| 3,981,836 A | 9/1976 | Pangle, Jr. et al. |
| RE29,383 E | 9/1977 | Gallatin et al. |
| 4,047,003 A | 9/1977 | LaRocca et al. |
| 4,058,275 A | 11/1977 | Banks et al. |
| 4,088,413 A | 5/1978 | Rossignol de la Ronde et al. |
| 4,096,566 A | 6/1978 | Borie et al. |
| 4,099,413 A | 7/1978 | Ohte et al. |
| 4,322,976 A | 4/1982 | Sisson et al. |
| 4,337,516 A | 6/1982 | Murphy et al. |
| 4,408,285 A | 10/1983 | Sisson et al. |
| 4,425,798 A | 1/1984 | Nagai et al. |
| 4,435,770 A | 3/1984 | Shiohata et al. |
| 4,483,192 A | 11/1984 | Wachter |
| 4,493,042 A | 1/1985 | Shima et al. |
| 4,517,468 A | 5/1985 | Kemper et al. |
| 4,517,637 A | 5/1985 | Cassell |
| 4,527,271 A | 7/1985 | Hallee et al. |
| 4,530,234 A | 7/1985 | Cullick et al. |
| 4,586,151 A | 4/1986 | Buote |
| 4,602,343 A | 7/1986 | Dougherty |
| 4,607,325 A | 8/1986 | Horn |
| 4,628,437 A | 12/1986 | Poschmann et al. |
| 4,635,214 A | 1/1987 | Kasai et al. |
| 4,642,782 A | 2/1987 | Kemper et al. |
| 4,644,478 A | 2/1987 | Stephens et al. |
| 4,644,749 A | 2/1987 | Somes |
| 4,648,064 A | 3/1987 | Morley |
| 4,649,515 A | 3/1987 | Thompson et al. |
| 4,657,179 A | 4/1987 | Aggers et al. |
| 4,663,704 A | 5/1987 | Jones et al. |
| 4,672,529 A | 6/1987 | Kupersmit |
| 4,680,753 A | 7/1987 | Fulton et al. |
| 4,683,542 A | 7/1987 | Taniguti et al. |
| 4,707,796 A | 11/1987 | Calabro et al. |
| 4,734,873 A | 3/1988 | Malloy et al. |
| 4,758,964 A | 7/1988 | Bittner et al. |
| 4,763,243 A | 8/1988 | Barlow et al. |
| 4,764,862 A | 8/1988 | Barlow et al. |
| 4,770,543 A | 9/1988 | Burghoff et al. |
| 4,774,656 A | 9/1988 | Quatse et al. |
| 4,777,585 A | 10/1988 | Kokawa et al. |
| 4,819,233 A | 4/1989 | Delucia et al. |
| 4,821,177 A * | 4/1989 | Koegel et al. ................ 711/149 |
| 4,831,564 A | 5/1989 | Suga et al. |
| 4,843,557 A | 6/1989 | Ina et al. |
| 4,853,175 A | 8/1989 | Book, Sr. |
| 4,864,489 A | 9/1989 | Yasuhara et al. |
| 4,873,655 A | 10/1989 | Kondraske |
| 4,885,694 A | 12/1989 | Pray et al. |
| 4,885,707 A | 12/1989 | Nichol et al. |
| RE33,162 E | 2/1990 | Yoshida et al. |
| 4,907,167 A | 3/1990 | Skeirik |
| 4,910,658 A | 3/1990 | Dudash et al. |
| 4,910,691 A | 3/1990 | Skeirik |
| 4,918,690 A | 4/1990 | Markkula, Jr. et al. |
| 4,922,412 A | 5/1990 | Lane et al. |
| 4,924,418 A | 5/1990 | Bachman et al. |
| 4,934,196 A | 6/1990 | Romano |
| 4,942,514 A | 7/1990 | Miyagaki et al. |
| 4,944,035 A | 7/1990 | Roger et al. |
| 4,956,793 A | 9/1990 | Bonne et al. |
| 4,964,125 A | 10/1990 | Kim |
| 4,965,742 A | 10/1990 | Skeirik |
| 4,965,880 A | 10/1990 | Petitjean |
| 4,980,844 A | 12/1990 | Demjanenko et al. |
| 4,992,965 A | 2/1991 | Holter et al. |
| 5,005,142 A | 4/1991 | Lipchak et al. |
| 5,006,992 A | 4/1991 | Skeirik |
| 5,008,810 A | 4/1991 | Kessel et al. |
| 5,014,208 A | 5/1991 | Wolfson |
| 5,015,934 A | 5/1991 | Holley et al. |
| 5,018,215 A | 5/1991 | Nasr et al. |
| 5,043,862 A | 8/1991 | Takahashi et al. |
| 5,043,863 A | 8/1991 | Bristol et al. |
| 5,050,095 A | 9/1991 | Samad |
| 5,053,815 A | 10/1991 | Wendell |
| 5,068,778 A | 11/1991 | Kosem et al. |
| 5,070,458 A | 12/1991 | Gilmore et al. |
| 5,081,598 A | 1/1992 | Bellows et al. |
| 5,089,978 A | 2/1992 | Lipner et al. |
| 5,089,984 A | 2/1992 | Struger et al. |
| 5,094,107 A | 3/1992 | Schoch |
| 5,095,417 A | 3/1992 | Hagiwara et al. |
| 5,095,524 A * | 3/1992 | Watanabe et al. ............. 718/101 |
| 5,098,197 A | 3/1992 | Shepard et al. |
| 5,099,436 A | 3/1992 | McCown et al. |
| 5,103,409 A | 4/1992 | Shimizu et al. |
| 5,111,531 A | 5/1992 | Grayson et al. |
| 5,121,467 A | 6/1992 | Skeirik |
| 5,122,948 A | 6/1992 | Zapolin |
| 5,122,976 A | 6/1992 | Bellows et al. |
| 5,130,936 A | 7/1992 | Sheppard et al. |
| 5,134,574 A | 7/1992 | Beaverstock et al. |
| 5,140,530 A | 8/1992 | Guha et al. |
| 5,142,612 A | 8/1992 | Skeirik |
| 5,146,401 A | 9/1992 | Bansal et al. |
| 5,148,378 A | 9/1992 | Shibayama et al. |
| 5,157,595 A | 10/1992 | Lovrenich |
| 5,161,013 A | 11/1992 | Rylander et al. |
| 5,163,151 A | 11/1992 | Bronikowski et al. |
| 5,167,009 A | 11/1992 | Skeirik |
| 5,168,441 A | 12/1992 | Onarheim et al. |
| 5,175,678 A | 12/1992 | Frerichs et al. |
| 5,187,674 A | 2/1993 | Boone |
| 5,189,232 A | 2/1993 | Shabtai et al. |
| 5,193,143 A | 3/1993 | Kaemmerer et al. |
| 5,197,114 A | 3/1993 | Skeirik |
| 5,197,328 A | 3/1993 | Fitzgerald |
| 5,200,028 A | 4/1993 | Tatsumi et al. |
| 5,200,958 A | 4/1993 | Hamilton et al. |
| 5,210,704 A | 5/1993 | Husseiny |
| 5,212,765 A | 5/1993 | Skeirik |
| 5,214,582 A | 5/1993 | Gray |
| 5,224,203 A | 6/1993 | Skeirik |
| 5,228,780 A | 7/1993 | Shepard et al. |
| 5,235,527 A | 8/1993 | Ogawa et al. |
| 5,247,450 A | 9/1993 | Clark |
| 5,251,151 A | 10/1993 | Demjanenko et al. |
| 5,265,005 A | 11/1993 | Schmidt et al. |
| 5,265,031 A | 11/1993 | Malczewski |
| 5,265,222 A | 11/1993 | Nishiya et al. |
| 5,274,572 A | 12/1993 | O'Neill et al. |
| 5,282,128 A | 1/1994 | Braude |
| 5,282,131 A | 1/1994 | Rudd et al. |
| 5,282,261 A | 1/1994 | Skeirik |
| 5,289,365 A | 2/1994 | Caldwell et al. |
| 5,291,190 A | 3/1994 | Scarola et al. |
| 5,293,585 A | 3/1994 | Morita et al. |
| 5,301,101 A | 4/1994 | MacArthur et al. |
| 5,303,181 A | 4/1994 | Stockton |
| 5,305,230 A | 4/1994 | Matsumoto et al. |
| 5,307,491 A | 4/1994 | Feriozi et al. |
| 5,311,421 A | 5/1994 | Nomura et al. |
| 5,311,447 A | 5/1994 | Bonne |
| 5,311,451 A | 5/1994 | Barrett |
| 5,311,562 A | 5/1994 | Palosamy et al. |
| 5,315,521 A | 5/1994 | Hanson et al. |
| 5,317,520 A | 5/1994 | Castle |
| 5,319,751 A | 6/1994 | Garney |
| 5,325,522 A | 6/1994 | Vaughn |
| 5,327,357 A | 7/1994 | Feinstein et al. |
| 5,329,443 A | 7/1994 | Bonaquist et al. |
| 5,333,114 A | 7/1994 | Warrior et al. |
| 5,333,240 A | 7/1994 | Matsumoto et al. |
| 5,333,298 A | 7/1994 | Bland et al. |
| 5,347,449 A | 9/1994 | Meyer et al. |
| 5,349,541 A | 9/1994 | Alexandro, Jr. et al. |

(56) References Cited

U.S. PATENT DOCUMENTS

| | | |
|---|---|---|
| 5,351,184 A | 9/1994 | Lu et al. |
| 5,353,207 A | 10/1994 | Keeler et al. |
| 5,353,315 A | 10/1994 | Scarola et al. |
| 5,361,612 A | 11/1994 | Voiculescu et al. |
| 5,365,423 A | 11/1994 | Chand |
| 5,367,624 A | 11/1994 | Cooper |
| 5,369,599 A | 11/1994 | Sadjadi et al. |
| 5,373,452 A | 12/1994 | Guha |
| 5,384,698 A | 1/1995 | Jelinek |
| 5,384,699 A | 1/1995 | Levy et al. |
| 5,386,360 A | 1/1995 | Wilson et al. |
| 5,386,373 A | 1/1995 | Keeler et al. |
| 5,390,287 A | 2/1995 | Obata et al. |
| 5,390,326 A | 2/1995 | Shah |
| 5,392,226 A | 2/1995 | Hamilton |
| 5,394,341 A | 2/1995 | Kepner |
| 5,394,543 A | 2/1995 | Hill et al. |
| 5,396,415 A | 3/1995 | Konar et al. |
| 5,398,303 A | 3/1995 | Tanaka |
| 5,400,246 A | 3/1995 | Wilson et al. |
| 5,404,064 A | 4/1995 | Mermelstein et al. |
| 5,406,176 A | 4/1995 | Sugden |
| 5,408,406 A | 4/1995 | Mathur et al. |
| 5,408,586 A | 4/1995 | Skeirik |
| 5,412,643 A | 5/1995 | Kogure |
| 5,414,645 A | 5/1995 | Hirano et al. |
| 5,419,197 A | 5/1995 | Ogi et al. |
| 5,430,642 A | 7/1995 | Nakajima et al. |
| 5,440,478 A | 8/1995 | Fisher et al. |
| 5,442,544 A | 8/1995 | Jelinek |
| 5,450,346 A | 9/1995 | Krummen et al. |
| 5,459,867 A | 10/1995 | Adams et al. |
| 5,461,570 A | 10/1995 | Wang et al. |
| 5,465,364 A | 11/1995 | Lathrop et al. |
| 5,467,355 A | 11/1995 | Umeda et al. |
| 5,469,352 A | 11/1995 | Yukutomo et al. |
| 5,469,735 A | 11/1995 | Watanabe et al. |
| 5,483,387 A | 1/1996 | Bauhahn et al. |
| 5,485,400 A | 1/1996 | Warrior et al. |
| 5,485,753 A | 1/1996 | Burns et al. |
| 5,486,920 A | 1/1996 | Killpatrick et al. |
| 5,486,995 A | 1/1996 | Krist et al. |
| 5,486,996 A | 1/1996 | Samad et al. |
| 5,486,998 A | 1/1996 | Corso |
| 5,488,697 A | 1/1996 | Kaemmerer et al. |
| 5,489,831 A | 2/1996 | Harris |
| 5,497,316 A | 3/1996 | Sierk et al. |
| 5,499,188 A | 3/1996 | Kline, Jr. et al. |
| 5,500,941 A | 3/1996 | Gil et al. |
| 5,504,863 A | 4/1996 | Yoshida et al. |
| 5,511,004 A | 4/1996 | Dubost et al. |
| 5,511,442 A | 4/1996 | Tame |
| 5,521,814 A | 5/1996 | Teran et al. |
| 5,521,842 A | 5/1996 | Yamoda |
| 5,528,510 A | 6/1996 | Kraft |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,548,528 A | 8/1996 | Keeler et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,570,300 A | 10/1996 | Henry et al. |
| 5,572,420 A | 11/1996 | Lu |
| 5,574,638 A | 11/1996 | Lu |
| 5,576,946 A | 11/1996 | Bender et al. |
| 5,586,066 A | 12/1996 | White et al. |
| 5,586,324 A | 12/1996 | Sato et al. |
| 5,596,704 A | 1/1997 | Geddes et al. |
| 5,598,521 A | 1/1997 | Kilgore et al. |
| 5,600,148 A | 2/1997 | Cole et al. |
| 5,602,757 A | 2/1997 | Haseley et al. |
| 5,602,761 A | 2/1997 | Spoerre et al. |
| 5,604,914 A | 2/1997 | Kabe et al. |
| 5,608,845 A | 3/1997 | Ohtsuka et al. |
| 5,610,339 A | 3/1997 | Haseley et al. |
| 5,613,123 A | 3/1997 | Tsang et al. |
| 5,623,598 A | 4/1997 | Voigt et al. |
| 5,625,574 A | 4/1997 | Griffiths et al. |
| 5,628,994 A | 5/1997 | Kaper et al. |
| 5,631,825 A | 5/1997 | van Weele et al. |
| 5,640,491 A | 6/1997 | Bhat et al. |
| 5,640,493 A | 6/1997 | Skeirik |
| 5,646,350 A | 7/1997 | Robinson et al. |
| 5,666,297 A | 9/1997 | Britt et al. |
| 5,671,335 A | 9/1997 | Davis et al. |
| 5,671,351 A | 9/1997 | Wild et al. |
| 5,673,194 A | 9/1997 | Cipelletti et al. |
| 5,675,504 A | 10/1997 | Serodes et al. |
| 5,680,409 A | 10/1997 | Qin et al. |
| 5,682,309 A | 10/1997 | Bartusiak et al. |
| 5,687,090 A | 11/1997 | Chen et al. |
| 5,691,895 A | 11/1997 | Kurtzberg et al. |
| 5,692,158 A | 11/1997 | Degeneff et al. |
| 5,698,788 A | 12/1997 | Mol et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,745,364 A | 4/1998 | Togashi et al. |
| 5,754,451 A | 5/1998 | Williams |
| 5,757,371 A | 5/1998 | Oran et al. |
| 5,761,086 A | 6/1998 | Cranford, III |
| 5,761,518 A | 6/1998 | Boehling et al. |
| 5,764,891 A | 6/1998 | Warrior |
| 5,768,119 A | 6/1998 | Havekost et al. |
| 5,774,875 A | 6/1998 | Medeiros et al. |
| 5,777,872 A | 7/1998 | He |
| 5,781,432 A | 7/1998 | Keeler et al. |
| 5,781,878 A | 7/1998 | Mizoguchi et al. |
| 5,790,898 A | 8/1998 | Kishima et al. |
| 5,796,602 A | 8/1998 | Wellan et al. |
| 5,796,606 A | 8/1998 | Spring et al. |
| 5,796,609 A | 8/1998 | Tao et al. |
| 5,798,939 A | 8/1998 | Ochoa et al. |
| 5,805,442 A | 9/1998 | Crater et al. |
| 5,809,490 A | 9/1998 | Guiver et al. |
| 5,812,934 A | 9/1998 | Hard et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,838,561 A | 11/1998 | Owen |
| 5,839,291 A | 11/1998 | Chang et al. |
| 5,842,189 A | 11/1998 | Keeler et al. |
| 5,847,952 A | 12/1998 | Samad |
| 5,848,365 A | 12/1998 | Coverdill |
| 5,855,791 A | 1/1999 | Hays et al. |
| 5,859,773 A | 1/1999 | Keeler et al. |
| 5,859,885 A | 1/1999 | Rusnica et al. |
| 5,859,964 A | 1/1999 | Wang et al. |
| 5,870,696 A | 2/1999 | Randolph |
| 5,875,420 A | 2/1999 | Piety et al. |
| 5,877,954 A | 3/1999 | Klimasauskas et al. |
| 5,880,716 A | 3/1999 | Kunugi et al. |
| 5,889,674 A | 3/1999 | Burdick et al. |
| 5,892,679 A | 4/1999 | He |
| 5,892,939 A | 4/1999 | Call et al. |
| 5,896,292 A | 4/1999 | Hosaka et al. |
| 5,896,294 A | 4/1999 | Chow et al. |
| 5,898,869 A | 4/1999 | Anderson |
| 5,901,058 A | 5/1999 | Steinman et al. |
| 5,903,455 A | 5/1999 | Sharpe, Jr. et al. |
| 5,905,989 A | 5/1999 | Biggs |
| 5,906,214 A | 5/1999 | Gueret et al. |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,914,875 A | 6/1999 | Monta et al. |
| 5,918,233 A | 6/1999 | La Chance et al. |

(56) References Cited

U.S. PATENT DOCUMENTS

| | | |
|---|---|---|
| 5,922,963 A | 7/1999 | Piety et al. |
| 5,924,086 A | 7/1999 | Mathur et al. |
| 5,926,186 A | 7/1999 | Itoh et al. |
| 5,930,137 A | 7/1999 | Togashi et al. |
| 5,940,290 A | 8/1999 | Dixon |
| 5,948,101 A | 9/1999 | David et al. |
| 5,949,417 A | 9/1999 | Calder |
| 5,951,654 A | 9/1999 | Avsan et al. |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 5,995,916 A | 11/1999 | Nixon et al. |
| 5,997,167 A | 12/1999 | Crater et al. |
| 6,006,171 A | 12/1999 | Vines et al. |
| 6,008,985 A | 12/1999 | Lake et al. |
| 6,014,612 A | 1/2000 | Larson et al. |
| 6,017,143 A | 1/2000 | Eryurek et al. |
| 6,026,352 A | 2/2000 | Burns et al. |
| 6,033,257 A | 3/2000 | Lake et al. |
| 6,035,339 A | 3/2000 | Agraharam et al. |
| 6,038,486 A | 3/2000 | Saitoh et al. |
| 6,038,540 A | 3/2000 | Krist et al. |
| 6,041,178 A | 3/2000 | Rybarczyk et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,061,603 A | 5/2000 | Papadopoulos et al. |
| 6,067,505 A | 5/2000 | Bonoyer et al. |
| 6,076,124 A | 6/2000 | Korowitz et al. |
| 6,078,843 A | 6/2000 | Shavit |
| 6,078,924 A | 6/2000 | Ainsbury et al. |
| 6,093,211 A | 7/2000 | Hamielec et al. |
| 6,094,600 A | 7/2000 | Sharpe, Jr. et al. |
| 6,106,785 A | 8/2000 | Haviena et al. |
| 6,108,616 A | 8/2000 | Borchers et al. |
| 6,110,214 A | 8/2000 | Kiimasaukas |
| 6,119,047 A | 9/2000 | Eryurek et al. |
| 6,122,555 A | 9/2000 | Lu |
| 6,128,279 A | 10/2000 | O'Neil et al. |
| 6,134,574 A | 10/2000 | Oberman et al. |
| 6,144,952 A | 11/2000 | Keeler et al. |
| 6,169,980 B1 | 1/2001 | Keeler et al. |
| 6,185,470 B1 | 2/2001 | Pado et al. |
| 6,197,480 B1 | 3/2001 | Iguchi et al. |
| 6,243,615 B1 | 6/2001 | Neway et al. |
| 6,246,972 B1 | 6/2001 | Klimasauskas |
| 6,259,959 B1 | 7/2001 | Martin |
| 6,266,726 B1 | 7/2001 | Nixon et al. |
| 6,289,368 B1 | 9/2001 | Dentler et al. |
| 6,298,377 B1 | 10/2001 | Hartikainen et al. |
| 6,298,454 B1 | 10/2001 | Schleiss et al. |
| 6,317,638 B1 | 11/2001 | Schreder et al. |
| 6,317,701 B1 | 11/2001 | Pyotsia et al. |
| 6,332,110 B1 | 12/2001 | Wolfe |
| 6,363,294 B1 | 3/2002 | Coronel et al. |
| 6,385,494 B1 | 5/2002 | Blahnik et al. |
| 6,389,331 B1 | 5/2002 | Jensen et al. |
| 6,397,114 B1 | 5/2002 | Eryurek |
| 6,400,681 B1 | 6/2002 | Bertin et al. |
| 6,418,465 B1 | 7/2002 | Hirosawa et al. |
| 6,421,571 B1 | 7/2002 | Spriggs et al. |
| 6,434,435 B1 | 8/2002 | Tubel et al. |
| 6,438,436 B1 | 8/2002 | Hohkibara et al. |
| 6,443,435 B1 | 9/2002 | Hendrickson |
| 6,445,963 B1 | 9/2002 | Blevins et al. |
| 6,507,797 B1 | 1/2003 | Kliman et al. |
| 6,522,939 B1 | 2/2003 | Strauch et al. |
| 6,529,780 B1 | 3/2003 | Soergel et al. |
| 6,532,392 B1 | 3/2003 | Eryurek et al. |
| 6,535,769 B1 | 3/2003 | Konar et al. |
| 6,539,267 B1 | 3/2003 | Eryurek et al. |
| 6,549,130 B1 | 4/2003 | Joao |
| 6,567,718 B1 | 5/2003 | Campbell et al. |
| 6,571,273 B1 | 5/2003 | Shirai et al. |
| 6,584,501 B1 | 6/2003 | Cartsonis et al. |
| 6,591,260 B1 | 7/2003 | Schwarzhoff et al. |
| 6,609,040 B1 | 8/2003 | Brunnemann et al. |
| 6,615,090 B1 | 9/2003 | Blevins et al. |
| 6,628,994 B1 | 9/2003 | Turicchi, Jr. et al. |
| 6,629,003 B1 | 9/2003 | Frizzell et al. |
| 6,633,782 B1 | 10/2003 | Schleiss et al. |
| 6,651,012 B1 | 11/2003 | Bechhoefer |
| 6,654,697 B1 | 11/2003 | Eryurek et al. |
| 6,681,155 B1 | 1/2004 | Fujita et al. |
| 6,690,274 B1 | 2/2004 | Bristol |
| 6,704,689 B1 | 3/2004 | Hogan et al. |
| 6,717,513 B1 | 4/2004 | Sandelman et al. |
| 6,721,609 B1 | 4/2004 | Wojsznis |
| 6,732,191 B1 | 5/2004 | Baker et al. |
| 6,738,388 B1 | 5/2004 | Stevenson et al. |
| 6,758,168 B2 | 7/2004 | Koskinen et al. |
| 6,759,853 B2 * | 7/2004 | Butler ............................ 324/534 |
| 6,760,782 B1 | 7/2004 | Swales |
| 6,774,786 B1 | 8/2004 | Havekost |
| 6,795,798 B2 * | 9/2004 | Eryurek et al. ............... 702/188 |
| 6,836,894 B1 | 12/2004 | Hellerstein et al. |
| 6,875,401 B1 | 4/2005 | Suzuki et al. |
| 6,934,766 B1 | 8/2005 | Russell |
| 6,938,262 B2 | 8/2005 | Bao et al. |
| 6,954,797 B1 * | 10/2005 | Takeda et al. ................ 709/236 |
| 6,965,855 B1 | 11/2005 | Burbridge et al. |
| 6,968,389 B1 | 11/2005 | Menditto et al. |
| 7,020,876 B1 | 3/2006 | Dietz et al. |
| 7,079,984 B2 | 7/2006 | Eryurek et al. |
| 7,120,917 B2 | 10/2006 | Feist |
| 7,181,654 B2 | 2/2007 | Ford, Jr. et al. |
| 7,206,646 B2 * | 4/2007 | Nixon et al. ..................... 700/83 |
| 7,249,356 B1 | 7/2007 | Wilson et al. |
| 7,275,062 B2 | 9/2007 | Deitz et al. |
| 7,369,912 B2 | 5/2008 | Sherriff et al. |
| 7,515,977 B2 | 4/2009 | Eryurek et al. |
| 7,557,702 B2 * | 7/2009 | Eryurek et al. ............... 340/511 |
| 7,627,385 B2 | 12/2009 | McGreevy et al. |
| 7,650,405 B2 | 1/2010 | Hood et al. |
| 7,720,727 B2 | 5/2010 | Keyes et al. |
| 7,793,292 B2 | 9/2010 | Worek et al. |
| 8,005,647 B2 * | 8/2011 | Armstrong et al. .......... 702/188 |
| 8,276,186 B2 * | 9/2012 | DeFord et al. .................... 726/2 |
| 2002/0007422 A1 * | 1/2002 | Bennett ......................... 709/246 |
| 2002/0022894 A1 | 2/2002 | Eryurek et al. |
| 2002/0029130 A1 | 3/2002 | Eryurek et al. |
| 2002/0038156 A1 | 3/2002 | Eryurek et al. |
| 2002/0055790 A1 * | 5/2002 | Havekost ............ G05B 23/027 700/80 |
| 2002/0067370 A1 | 6/2002 | Forney et al. |
| 2002/0075009 A1 * | 6/2002 | Butler ............................ 324/534 |
| 2002/0077711 A1 * | 6/2002 | Nixon et al. ..................... 700/51 |
| 2002/0112064 A1 * | 8/2002 | Eastvold ........................ 709/230 |
| 2002/0123864 A1 * | 9/2002 | Eryurek et al. ............... 702/188 |
| 2002/0147511 A1 * | 10/2002 | Eryurek ............... G05B 23/027 700/80 |
| 2002/0156838 A1 | 10/2002 | Batke et al. |
| 2002/0161940 A1 | 10/2002 | Eryurek et al. |
| 2002/0163427 A1 * | 11/2002 | Eryurek ............... G05B 23/027 340/500 |
| 2002/0199014 A1 | 12/2002 | Yang et al. |
| 2003/0002969 A1 | 1/2003 | Risser |
| 2003/0009572 A1 | 1/2003 | Thurner |
| 2003/0014500 A1 | 1/2003 | Schleiss et al. |
| 2003/0028268 A1 | 2/2003 | Eryurek et al. |
| 2003/0040936 A1 | 2/2003 | Nader et al. |
| 2003/0065409 A1 | 4/2003 | Raeth et al. |
| 2003/0195934 A1 | 10/2003 | Peterson et al. |
| 2003/0214744 A1 * | 11/2003 | Ishii ........................ G11B 15/04 360/60 |
| 2003/0236579 A1 | 12/2003 | Hauhia et al. |
| 2004/0075689 A1 | 4/2004 | Schleiss et al. |
| 2004/0095237 A1 | 5/2004 | Chen et al. |
| 2004/0139085 A1 * | 7/2004 | Eryurek et al. ............... 707/100 |
| 2004/0181364 A1 | 9/2004 | Reeves et al. |
| 2004/0203874 A1 * | 10/2004 | Brandt et al. ............... 455/456.1 |

(56) References Cited

U.S. PATENT DOCUMENTS

| | | | |
|---|---|---|---|
| 2004/0249583 A1 | 12/2004 | Eryurek et al. | |
| 2004/0260408 A1* | 12/2004 | Scott et al. | 700/20 |
| 2005/0007249 A1* | 1/2005 | Eryurek et al. | 340/511 |
| 2005/0015624 A1 | 1/2005 | Ginter et al. | |
| 2005/0027376 A1* | 2/2005 | Lucas | G05B 19/0426 700/28 |
| 2005/0228708 A1 | 10/2005 | Catala et al. | |
| 2005/0240289 A1 | 10/2005 | Hoyte et al. | |
| 2006/0106921 A1* | 5/2006 | Sim et al. | 709/223 |
| 2006/0168013 A1* | 7/2006 | Wilson et al. | 709/206 |
| 2006/0229848 A1* | 10/2006 | Armstrong et al. | 702/184 |
| 2006/0241907 A1* | 10/2006 | Armstrong et al. | 702/182 |
| 2006/0259634 A1 | 11/2006 | Hood et al. | |
| 2007/0050070 A1 | 3/2007 | Strain et al. | |
| 2007/0100584 A1* | 5/2007 | August | G06Q 10/06 702/184 |
| 2007/0112801 A1 | 5/2007 | McGreevy et al. | |
| 2008/0086637 A1* | 4/2008 | Royalty | H04L 63/105 713/168 |
| 2008/0288321 A1* | 11/2008 | Dillon et al. | 705/9 |
| 2009/0106227 A1* | 4/2009 | Davis | G06Q 10/06 |
| 2010/0110634 A1* | 5/2010 | Woodbury et al. | 361/698 |
| 2010/0127824 A1* | 5/2010 | Moschl | G05B 19/4184 340/5.65 |
| 2010/0145476 A1* | 6/2010 | Junk et al. | 700/7 |
| 2010/0299172 A1* | 11/2010 | Nottoli | G06Q 10/06 705/7.18 |
| 2011/0167138 A1* | 7/2011 | Fieau et al. | 709/219 |
| 2011/0296330 A1* | 12/2011 | Shi | 715/771 |
| 2012/0078387 A1* | 3/2012 | Kashyap | G05B 23/0272 700/17 |
| 2012/0203419 A1* | 8/2012 | Tucker et al. | 701/23 |

FOREIGN PATENT DOCUMENTS

| | | |
|---|---|---|
| CN | 1403593 A | 3/2003 |
| CN | 1573627 A | 2/2005 |
| DE | 42 10 376 A1 | 10/1992 |
| DE | 44 33 593 | 6/1995 |
| DE | 195 02 499 | 8/1996 |
| DE | 1 99 62 230 A1 | 6/2001 |
| EP | 0 122 622 | 10/1984 |
| EP | 0 362 386 | 4/1990 |
| EP | 0 377 736 | 7/1990 |
| EP | 0 413 814 | 2/1991 |
| EP | 0 434 050 | 6/1991 |
| EP | 0 434 288 A2 | 6/1991 |
| EP | 0 434 986 A2 | 7/1991 |
| EP | 0 487 419 A2 | 5/1992 |
| EP | 0 560 226 A2 | 9/1993 |
| EP | 0 594 227 A1 | 4/1994 |
| EP | 0 612 039 A2 | 8/1994 |
| EP | 0 626 697 A1 | 11/1994 |
| EP | 0 644 470 A2 | 3/1995 |
| EP | 0 745 916 | 12/1996 |
| EP | 0 825 506 | 2/1998 |
| EP | 0 827 096 A2 | 3/1998 |
| EP | 0 959 398 A1 | 11/1999 |
| EP | 0 961 184 A2 | 12/1999 |
| EP | 0 964 325 A1 | 12/1999 |
| EP | 0 965 897 A1 | 12/1999 |
| EP | 1 160 691 A2 | 12/2001 |
| EP | 1 884 850 A1 | 2/2008 |
| FR | 2 692 701 A1 | 12/1993 |
| FR | 2 713 360 A1 | 6/1995 |
| GB | 2 083 258 A | 3/1982 |
| GB | 2 294 129 A | 4/1996 |
| GB | 2 294 793 A | 5/1996 |
| GB | 2 347 234 A | 8/2000 |
| GB | 2 353 616 | 2/2001 |
| GB | 2 372 365 A | 8/2002 |
| GB | 2 380 833 | 4/2003 |
| GB | 2 404 457 A | 2/2005 |
| JP | 02-197902 | 8/1990 |
| JP | 04-220521 | 8/1992 |
| JP | 05-122853 | 5/1993 |
| JP | 05-149763 A | 6/1993 |
| JP | 06-125584 A | 5/1994 |
| JP | 06-242192 | 9/1994 |
| JP | 06-273151 A | 9/1994 |
| JP | 06-331507 | 12/1994 |
| JP | 07-114601 A | 5/1995 |
| JP | 07-234988 | 9/1995 |
| JP | 07-334769 A | 12/1995 |
| JP | 08-126835 A | 5/1996 |
| JP | 08-261886 | 10/1996 |
| JP | 08-328608 A | 12/1996 |
| JP | 09-200262 | 7/1997 |
| JP | 10-039728 | 2/1998 |
| JP | 10-260821 | 9/1998 |
| JP | 10-228312 A | 11/1998 |
| JP | 10-320039 | 12/1998 |
| JP | 11-134154 A | 5/1999 |
| JP | 11-231924 | 8/1999 |
| JP | 11-355325 A | 12/1999 |
| JP | 2000-067015 | 3/2000 |
| JP | 2000-078750 A | 3/2000 |
| JP | 2000-137504 A | 5/2000 |
| JP | 2000-242864 A | 9/2000 |
| JP | 2000-305620 | 11/2000 |
| JP | 2001-016662 | 1/2001 |
| JP | 2001-022430 A | 1/2001 |
| JP | 2001-044997 A | 2/2001 |
| JP | 2001-296916 | 10/2001 |
| JP | 2001-350507 A | 12/2001 |
| JP | 2002-015376 A | 1/2002 |
| JP | 2002-323922 A | 11/2002 |
| JP | 2003-058206 A | 2/2003 |
| JP | 2004-164048 | 6/2004 |
| JP | 2004-355622 A | 12/2004 |
| JP | 2009-135892 A | 6/2009 |
| RU | 2103668 | 1/1998 |
| RU | 2114456 | 6/1998 |
| RU | 2154853 | 8/2000 |
| RU | 2178578 | 1/2002 |
| WO | WO-95/04314 A1 | 2/1995 |
| WO | WO-95/09387 A1 | 4/1995 |
| WO | WO-95/26527 A1 | 10/1995 |
| WO | WO-96/07957 A1 | 3/1996 |
| WO | WO-98/38585 | 9/1998 |
| WO | WO-99/13418 | 3/1999 |
| WO | WO-00/50851 A1 | 8/2000 |
| WO | WO-01/08054 A2 | 2/2001 |
| WO | WO-02/23405 | 3/2002 |
| WO | WO-02/95633 | 11/2002 |
| WO | WO-02/095633 A2 | 11/2002 |
| WO | WO-03/019304 A1 | 3/2003 |
| WO | WO-03/023687 A2 | 3/2003 |
| WO | WO-03/075206 A2 | 9/2003 |
| WO | WO-2004/068026 A2 | 8/2004 |
| WO | WO-2007/017738 A2 | 2/2007 |

OTHER PUBLICATIONS

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

"Customer Impact," GE Industrial Systems, available at http://www.geindustrial.com/cwc/services?id=73 on Jul. 18, 2002.

"Electrical Equipment Coverage," GE Industrial Systems, available at http://www.geindustrial.com/cwc/services?id=72 on Jul. 18, 2002.

"GE Predictor™ Services: GE Predictor Services Overview," GE Industrial Systems, available at http://www.geindustrial.com/cwc/services?id=71 on Jul. 18, 2002.

"LabView® Scientific Software for the Macintosh," National Instruments Corporation, pp. 1-452 (1989).

"Status Signals of Field Instruments," NAMUR Recommendation, NA 64, Feb. 1, 2001, pp. 1-8.

(56) References Cited

OTHER PUBLICATIONS

Author unknown, "NT-Based Recipe Provides Graphical Editor and Simplified Integration," Control Magazine, 146-147 (1997).
Author unknown, "SP88 Reduces Batch Variation," Online Posting: http://www.controlmagazine.com/0897/c0740897.html.
Bray et al., "Practical Alarm Filtering," *Intech*, 41(2):34-36 (1994).
Coote et al., "Graphical and Iconic Programming Languages for Distributed Process Control: An Object Oriented Approach," *IEEE*, pp. 183-190 (1988).
Dayal et al., "Process Coordination: State of the Art, Trends, and Open Issues," *Proceedings of the 27th International Conference on Very Large Data Bases*, pp. 3-13 (2001).
Decision of Rejection for Japanese Application No. 2009-1227, dated Feb. 28, 2012.
dotnet.za.net, "Web Services—A Guide for Business and IT Managers (Sep. 23, 2001)", (Copyright 2001), www.dotnet.za.net.
Elmqvist, "A Uniform Architecture for Distributed Automation," *ISA*, pp. 1599-1608 (1991).
Elmqvist, "An Object and Data-flow Based Visual Language for Process Control," *ISA*, pp. 181-192 (1992).
Fisher, "Cornerstone Base Station," Model 2500H1, Product Data Sheet PDS 4693, *Fisher-Rosemount Systems, Inc.*, pp. 1-8 (Sep. 1995).
Fisher, "FIELDVUE ValveLink VL2000 Software," Bulletin 62.1:VL2000, *Fisher Controls International, Inc.*, pp. 1-6 (Nov. 1995).
Fisher, "PC-Based Communications Program," ProLink Software, Product Data Sheet PS-00033, *Micro Motion, Inc.*, 2 pages (Nov. 1995).
Gensym Corporation, "G2 Reference Manual, Version 3.0," pp. 1-539 (1992).
Graupner et al., "E-Speak: An Enabling Infrastructure for Web-Based E-Services," Proceedings of International Conferences on Advances in Infrastructure for Electronic Business (2000). Retrieved from the Internet: URL:http://yangtze.cs.uiuc.edu/~wooyoung/espeak-ssgrr.pdf.
Halpert, Object Oriented Programming for Motion Control, *IEEE*, pp. 58-68 (1991).
Ichikawa et al., "Visual Programming—Toward Realization of User-friendly Programming Environments,"*IEEE*, pp. 129-137 (1987).
Johnson Yokogawa Corporation, "The JC-5000™ System Operator Command Station Engineer's Guide" (1990).
Johnson, "Distributed Control: A View of What's New," Online Posting, Control Engineering Online (1996) http://www.manufacturing.net/magazine/ce/archives/1996/09/issues/na/09a700.html.
Kalkhoff, "Agent-Oriented Robot Task Transformation," Proceedings of the International Symposium on Intelligent Control, IEEE, pp. 242-247 (Aug. 27, 1995).
Kim et al., "Web E-Speak: Facilitating Web-Based E-Services," Multimedia, IEEE 9(1):43-55 (2002).
Kourti et al., "Process Analysis, Monitoring and Diagnosis, Using Multivariate Projection Method," *Chemometrics and Intelligent laboratory Systems*, 38:3-21 (1995).
Kuno et al., "My Agent Wants to Talk to Your Service: Personalizing Web Services Through Agents," *Proceedings of the First International Workshop on Challenges in Open Agent Systems* (2002). Retrieved from the Internet on Apr. 22, 2010: URL:http://www.hpl.hp.com/techreports/2002/HPL-2002-114.pdf.
Lighthammer Software Development, "Illuminator™ The 1st 'Plant Information Portal'™" (Copyright 1999).
Mazeda et al., "Supervision and Optimized Process Control in Sugar Beet Factories," Centre of Sugar Technology, Spain from www.univ-reims.fr/externes/avh10mazaeda.pdf.
Mehta et al., "Feedforward Neural Networks for Process Identification and Prediction," presented at ISA 2001, Houston, Texas, Sep. 2001.
Nomikos, "Multi-Way Partial Least Squares in Monitoring Batch processes," *Chemometrics and intelligent Laboratory Systems*, 30:97-108 (1996).
Parker et al., Distribution System for Structured Information (2001).
Piper, "Distributed Control Systems Spread Out," Online Posting: http://www.controlmagazine.com/0697/c0370697.html.
Sheldon et al., "Discover: A Resource Discovery System Based on Content Routing," Proc. 3rd International World Wide Web Conference (1995).
Simensen et al., "A Framework for Batch Plant Information Models," Petri Netw Newsletter (1996).
Systinet, "Introduction to Web Services", (Copyright 2001, 2002), www.systinet.com.
Tzovla et al., "Abnormal Condition Management Using Expert Systems," presented at ISA 2001, Houston, Texas, Sep. 2001.
UCOS™ "The Only Truly Open Solution for Distributed Control" Control Systems International®.
Web Services Architect, "What are Web Services", www.webservicesarchitect.com.
Woitsch et al., "Process-Oriented Knowledge Management Systems Based on KM-Services: The Promote Approach," Proceedings of the International Conferences on Practical Aspects of Knowledge Management, pp. 398-412 (2002).
Zolera Systems, "A Brief Guide to Web Services Protocols" (Copyright 2001), www.zolera.com.
Notice of Reasons for Rejection for JP Application No. 2012-115167 dated Mar. 7, 2016.
First Office Action received in counterpart Chinese patent application No. 201210162163.0, dated Dec. 2, 2015.
Notice of Reasons for Rejection for JP Application No. 2012-115167 dated Nov. 28, 2016.
Third Office Action received in counterpart Chinese patent application No. 201210162163.0, dated Jan. 4, 2017.
Second Office Action received in counterpart Chinese patent application No. 201210162163.0, dated Jul. 7, 2016.
Examination Report for Application No. GB1208679.9, dated Dec. 18, 2017.

\* cited by examiner

FIG. 5

| | DEVICE_TAG | ASSIGNED TO | DEVICE_TAG | ASSIGNED TO | |
|---|---|---|---|---|---|
| 301 | REACTOR_A | OPERATIONS | VALVE_276A | OPERATIONS | 325 |
| 302 | REACTOR_B | MAINTENANCE | VALVE_276B | OPERATIONS | 326 |
| 303 | REACTOR_C | OPERATIONS | VALVE_276C | OPERATIONS | 327 |
| 304 | REACTOR_D | OPERATIONS | VALVE_276D | OPERATIONS | 328 |
| 305 | FILTER_01 | OPERATIONS | VALVE_278A | OPERATIONS | 329 |
| 306 | FILTER_02 | OPERATIONS | VALVE_278B | OPERATIONS | 330 |
| 307 | FILTER_03 | OPERATIONS | VALVE_278C | OPERATIONS | 331 |
| 308 | FILTER_04 | MAINTENANCE | VALVE_278D | OPERATIONS | 332 |
| 309 | DRYER_01 | MAINTENANCE | VALVE_280A | OPERATIONS | 333 |
| 310 | DRYER_02 | OPERATIONS | VALVE_280B | OPERATIONS | 334 |
| 311 | DRYER_03 | OPERATIONS | VALVE_280C | OPERATIONS | 335 |
| 312 | DRYER_04 | OPERATIONS | VALVE_280D | OPERATIONS | 336 |
| 313 | VALVE_258A | OPERATIONS | VALVE_282A | OPERATIONS | 337 |
| 314 | VALVE_258B | MAINTENANCE | VALVE_282B | OPERATIONS | 338 |
| 315 | VALVE_258C | OPERATIONS | VALVE_282C | MAINTENANCE | 339 |
| 316 | VALVE_258D | OPERATIONS | VALVE_282D | OPERATIONS | 340 |
| 317 | VALVE_260A | OPERATIONS | LEV_SENS_264A | OPERATIONS | 341 |
| 318 | VALVE_260B | OPERATIONS | LEV_SENS_264B | OPERATIONS | 342 |
| 319 | VALVE_260C | OPERATIONS | LEV_SENS_264C | OPERATIONS | 343 |
| 320 | VALVE_260D | OPERATIONS | LEV_SENS_264D | OPERATIONS | 344 |
| 321 | VALVE_262A | OPERATIONS | AGITATOR_266A | OPERATIONS | 345 |
| 322 | VALVE_262B | OPERATIONS | AGITATOR_266B | OPERATIONS | 346 |
| 323 | VALVE_262C | OPERATIONS | AGITATOR_266C | OPERATIONS | 347 |
| 324 | VALVE_262D | OPERATIONS | AGITATOR_266D | OPERATIONS | 348 |

FIG. 6

| | DEVICE_TAG | ASSIGNED TO | TECHNICIAN | | DEVICE_TAG | ASSIGNED TO | TECHNICIAN |
|---|---|---|---|---|---|---|---|
| 401 | REACTOR_A | OPERATIONS | | 425 | VALVE_276A | MAINTENANCE | TECH 2 |
| 402 | REACTOR_B | MAINTENANCE | TECH 1 | 426 | VALVE_276B | MAINTENANCE | TECH 2 |
| 403 | REACTOR_C | OPERATIONS | | 427 | VALVE_276C | MAINTENANCE | TECH 2 |
| 404 | REACTOR_D | OPERATIONS | | 428 | VALVE_276D | MAINTENANCE | TECH 2 |
| 405 | FILTER_01 | MAINTENANCE | TECH 2 | 429 | VALVE_278A | OPERATIONS | |
| 406 | FILTER_02 | OPERATIONS | | 430 | VALVE_278B | OPERATIONS | |
| 407 | FILTER_03 | OPERATIONS | | 431 | VALVE_278C | OPERATIONS | |
| 408 | FILTER_04 | OPERATIONS | | 432 | VALVE_278D | OPERATIONS | |
| 409 | DRYER_01 | MAINTENANCE | TECH 2 | 433 | VALVE_280A | OPERATIONS | |
| 410 | DRYER_02 | OPERATIONS | | 434 | VALVE_280B | OPERATIONS | |
| 411 | DRYER_03 | OPERATIONS | | 435 | VALVE_280C | OPERATIONS | |
| 412 | DRYER_04 | OPERATIONS | | 436 | VALVE_280D | OPERATIONS | |
| 413 | VALVE_258A | OPERATIONS | | 437 | VALVE_282A | OPERATIONS | |
| 414 | VALVE_258B | MAINTENANCE | TECH 1 | 438 | VALVE_282B | OPERATIONS | |
| 415 | VALVE_258C | OPERATIONS | | 439 | VALVE_282C | MAINTENANCE | TECH 2 |
| 416 | VALVE_258D | OPERATIONS | | 440 | VALVE_282D | OPERATIONS | |
| 417 | VALVE_260A | OPERATIONS | | 441 | LEV_SENS_264A | OPERATIONS | |
| 418 | VALVE_260B | MAINTENANCE | TECH 1 | 442 | LEV_SENS_264B | MAINTENANCE | TECH 1 |
| 419 | VALVE_260C | OPERATIONS | | 443 | LEV_SENS_264C | OPERATIONS | |
| 420 | VALVE_260D | OPERATIONS | | 444 | LEV_SENS_264D | OPERATIONS | |
| 421 | VALVE_262A | OPERATIONS | | 445 | AGITATOR_266A | OPERATIONS | |
| 422 | VALVE_262B | OPERATIONS | | 446 | AGITATOR_266B | MAINTENANCE | TECH 1 |
| 423 | VALVE_262C | OPERATIONS | | 447 | AGITATOR_266C | OPERATIONS | |
| 424 | VALVE_262D | OPERATIONS | | 448 | AGITATOR_266D | OPERATIONS | |

| | DEVICE_TAG | ASSIGNED TO | TECHNICIAN | LEVEL | | DEVICE_TAG | ASSIGNED TO | TECHNICIAN | LEVEL |
|---|---|---|---|---|---|---|---|---|---|
| 501 | REACTOR_A | OPERATIONS | | | 525 | VALVE_276A | MAINTENANCE | TECH 2 | 1 |
| 502 | REACTOR_B | MAINTENANCE | TECH 1 | 1 | 526 | VALVE_276B | MAINTENANCE | TECH 2 | 1 |
| 503 | REACTOR_C | OPERATIONS | | | 527 | VALVE_276C | MAINTENANCE | TECH 2 | 1 |
| 504 | REACTOR_D | OPERATIONS | | | 528 | VALVE_276D | MAINTENANCE | TECH 2 | 1 |
| 505 | FILTER_01 | MAINTENANCE | TECH 2 | 0 | 529 | VALVE_278A | OPERATIONS | | |
| 506 | FILTER_02 | OPERATIONS | | | 530 | VALVE_278B | OPERATIONS | | |
| 507 | FILTER_03 | OPERATIONS | | | 531 | VALVE_278C | OPERATIONS | | |
| 508 | FILTER_04 | OPERATIONS | | | 532 | VALVE_278D | OPERATIONS | | |
| 509 | DRYER_01 | MAINTENANCE | TECH 2 | 2 | 533 | VALVE_280A | OPERATIONS | | |
| 510 | DRYER_02 | OPERATIONS | | | 534 | VALVE_280B | OPERATIONS | | |
| 511 | DRYER_03 | OPERATIONS | | | 535 | VALVE_280C | OPERATIONS | | |
| 512 | DRYER_04 | OPERATIONS | | | 536 | VALVE_280D | OPERATIONS | | |
| 513 | VALVE_258A | OPERATIONS | | | 537 | VALVE_282A | OPERATIONS | | |
| 514 | VALVE_258B | MAINTENANCE | TECH 1 | 1 | 538 | VALVE_282B | OPERATIONS | | |
| 515 | VALVE_258C | OPERATIONS | | | 539 | VALVE_282C | MAINTENANCE | TECH 2 | 1 |
| 516 | VALVE_258D | OPERATIONS | | | 540 | VALVE_282D | OPERATIONS | | |
| 517 | VALVE_260A | OPERATIONS | | | 541 | LEV_SENS_264A | OPERATIONS | | |
| 518 | VALVE_260B | MAINTENANCE | TECH 1 | 1 | 542 | LEV_SENS_264B | MAINTENANCE | TECH 1 | 0 |
| 519 | VALVE_260C | OPERATIONS | | | 543 | LEV_SENS_264C | OPERATIONS | | |
| 520 | VALVE_260D | OPERATIONS | | | 544 | LEV_SENS_264D | OPERATIONS | | |
| 521 | VALVE_262A | OPERATIONS | | | 545 | AGITATOR_266A | OPERATIONS | | |
| 522 | VALVE_262B | OPERATIONS | | | 546 | AGITATOR_266B | MAINTENANCE | TECH 1 | 1 |
| 523 | VALVE_262C | OPERATIONS | | | 547 | AGITATOR_266C | OPERATIONS | | |
| 524 | VALVE_262D | OPERATIONS | | | 548 | AGITATOR_266D | OPERATIONS | | |

Application Model View

FIG. 11

REQUEST SOFTWARE LOCK-OUT: ADD'L INFO

| Selected Devices /752 | Associated Devices /754 | Maintenance Type /756 | Access Type, Level /758 | Current Device State /760 | Recent Alarms /762 | Required Periodic Maintenance /764 |
|---|---|---|---|---|---|---|
| VALVE_260B | None | Select | 1 | ON LINE | NONE | |
| Reactor_B | Set 1 | Repair | 2 | OFF LINE | NONE | |
| LEV_SENSE_264_B | Set 1 | Replace | 1 | OFF LINE | NONE | |
| AGITATOR_266_B | Set 1 | Replace | 1 | OFF LINE | NONE | |
| Filter_02 | Set 1 | CAL | 2 | ON LINE | NONE | CALIBRATE |
| Dryer_02 | Set 2 | Replace | 1 | OFF LINE | NONE | |

Submit /724

SOFTWARE LOCKOUT COORDINATION BETWEEN A PROCESS CONTROL SYSTEM AND AN ASSET MANAGEMENT SYSTEM

RELATED APPLICATIONS

The following U.S. patents and patent application Publications are hereby incorporated herein by reference: U.S. Pat. No. 5,796,602, entitled "Method and Apparatus Using a Device Description for a Conventional Device"; U.S. Pat. No. 6,094,600, entitled "System and Method for Managing a Transaction Database of Records of Changes to Field Device Configurations"; U.S. Pat. No. 7,206,646, entitled "Method and Apparatus for Performing a Function in a Plant Using Process Performance Monitoring with Process Equipment Monitoring and Control"; U.S. Patent Application Publication No. 2005/0222698, entitled "Integrated Configuration System for Use in a Process Plant"; U.S. Pat. No. 7,181,654, entitled "System and Method for Detecting an Abnormal Situation Associated with a Reactor"; and U.S. Patent Application Publication No. 2008/0066019, entitled "Compact Batch Viewing Techniques for use in Batch Processes."

BACKGROUND

Process control networks, such as those used in chemical, petroleum, or other processes, generally include a centralized process controller communicatively coupled to one or more field devices which may be, for example, valve positioners, switches, sensors (such as temperature, pressure and flow rate sensors), etc. These field devices may perform physical control functions within the process plant (such as opening or closing a valve), may take measurements within the process plant for use in controlling the operation of the process plant, or may perform any other desired function within the process plant. The process plant may also include various other equipment, such as reactor tanks, filters, dryers, generators, turbines, heaters, etc. Process controllers have historically been connected to field devices and equipment via one or more analog signal lines or buses which may carry, for example, 4-20 mA (milliamp) signals to and from the field devices and/or other equipment. In the past couple of decades or so, however, the process control industry has developed a number of standard, open, digital, or combined digital and analog communication protocols such as the FOUNDATION™ FIELDBUS (hereinafter "Fieldbus"), HART®, PROFIBUS®, WORLDFIP®, Device-Net®, and CAN protocols which can be used to implement communications between a controller and field devices and equipment. Generally speaking, the process controller receives signals indicative of measurements made by one or more field devices and/or other information pertaining to the field devices, uses this information to implement on a processor therein a typically complex control routine stored on a computer-readable medium in the process controller, and generates control signals which are sent via the signal lines or buses to the field devices and equipment to thereby control the operation of the process plant.

A typical process plant will include numerous field devices taking measurements and performing physical control functions, as well as other process equipment. The various field devices and equipment will, at times, require maintenance and/or calibration. For example, a temperature sensor may require calibration on a regular basis (e.g., every six months), a control valve may require periodic lubrication, a reactor tank may require periodic cleaning, a turbine may require periodic lubrication, etc. Moreover, in the event that a field device or piece of equipment experiences a malfunction or a failure, maintenance may be required to restore the field device or equipment to an accuatable operating condition or otherwise remedy the malfunction. In some instances, a maintenance technician may perform the required operations (e.g., calibration, diagnostic tests, etc.) on equipment or field devices remotely (e.g., from an asset management system, such as the AMS Suite, sold by Emerson Process). In other instances, the required tasks (e.g., lubrication, replacement, etc.) may require a maintenance technician to attend to the equipment or field devices in the field.

Typically, when maintenance personnel require physical access to equipment in an industrial environment, the application of lock-out/tag-out procedures ensure personnel safety by providing physical and administrative safeguards to prevent the accidental operation or re-energization of the equipment while work is underway or, in any event, before it is safe to do so. In an electrical power distribution facility, for example, maintenance personnel may de-energize a piece of equipment (e.g., a distribution bus) by, for instance, opening a circuit breaker supplying the voltage and current to the equipment. A locking mechanism may physically lock the circuit breaker in the open (i.e., safe) position, and each person whose safety depends on the circuit breaker remaining open may place a personal padlock on the locking mechanism. In this manner, the locking mechanism prevents the circuit breaker from being closed (and prevents the equipment from being re-energized) until each maintenance technician has removed his or her padlock from the locking mechanism, thus ensuring that all maintenance personnel involved agree that it is safe to re-energize the equipment.

In a process control environment, similar concerns exist with regard to safeguarding equipment, processes, and personnel. For example, many process plants implement administrative procedures for performing maintenance. The administrative procedures are designed and implemented with the goal of preventing a maintenance technician, for example, from sending commands to (or otherwise making changes to) equipment and/or field devices, which changes could cause the product to be destroyed, cause materials to be wasted, or cause equipment to malfunction during a process. Another goal of the procedures is to protect maintenance personnel while the personnel perform maintenance on the various equipment by, for example, ensuring that a process operator does not cause process control equipment to begin operating while a maintenance technician is performing maintenance on the equipment (e.g., ensuring that a turbine does not begin operating while the technician is changing a fan blade on the turbine).

Unlike the physical interlocks that exist in many industrial environments, there is no formal method for coordinating the "lock out" of field instrumentation, associated with a process automation system, between the host control system, used to control the process, and the asset management system, used to track and maintain the process equipment. When a maintenance technician prepares to perform work on assets under control of the process control system, administrative work processes that rely on verbal communication dictate the transfer of control between the plant operator and maintenance technician. With the pervasiveness of digital communications and networking in process automation systems, it is becoming increasingly easy for plant personnel to make mistakes with verbal procedures, and the impact of the mistakes may be more significant.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 5 depicts one example of a table of assignment records that may be used in an exemplary software lockout coordination system;

FIG. 6 depicts a second example of a table of assignment records that may be used in an exemplary software lockout coordination system;

FIG. 7 depicts a third example of a table of assignment records that may be used in an exemplary software lockout coordination system;

FIG. 10A depicts an alternate exemplary device selection screen for use in a software lockout coordination system;

FIG. 11 depicts a screen displaying additional information about the devices selected using one of the exemplary device selection screens of FIGS. 9-11.

DETAILED DESCRIPTION

Figure 1:
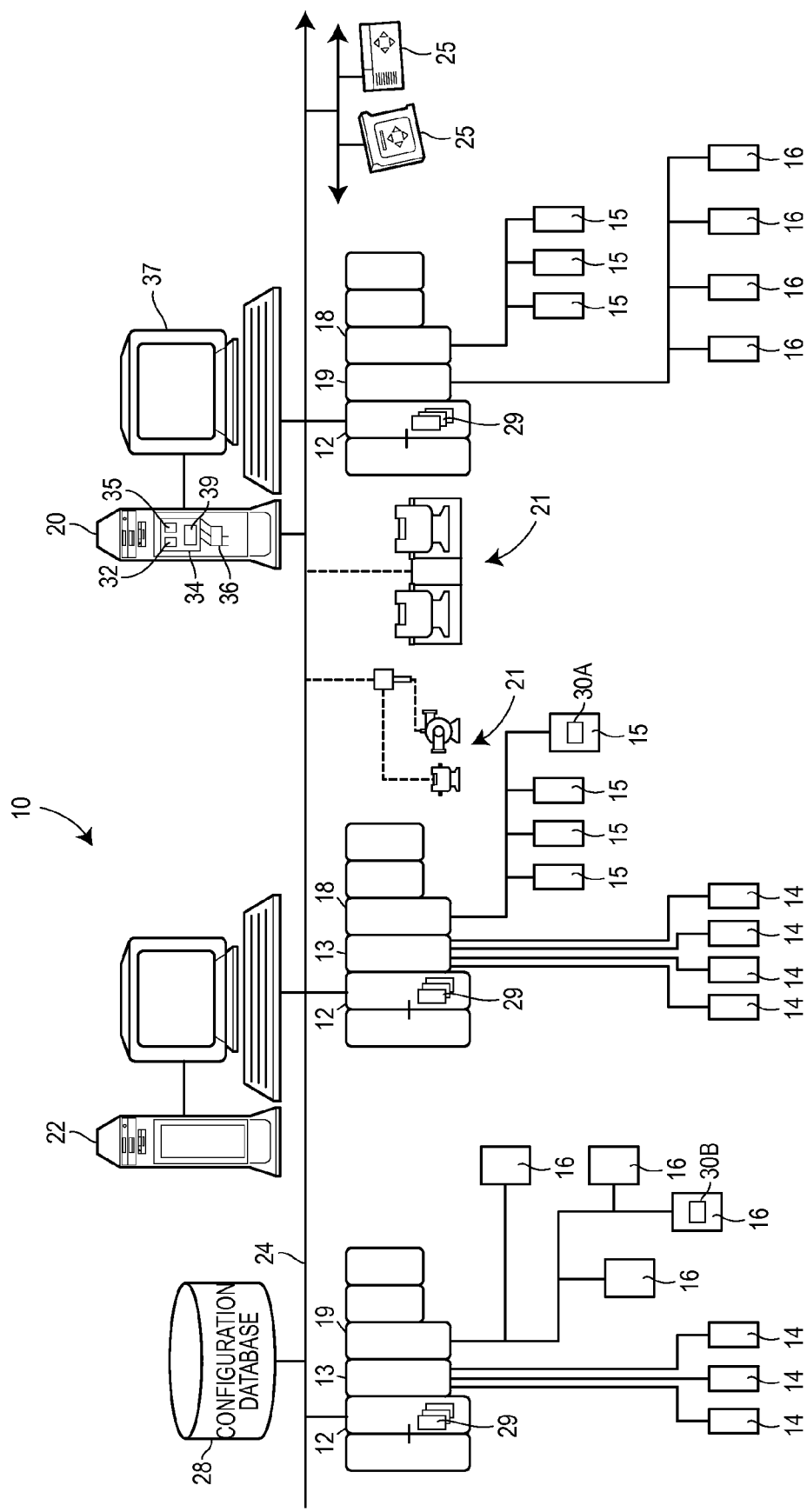
FIG. 1 is an exemplary block diagram of a distributed process control network located within a process plant including a process control system workstation and an asset management system workstation, and which implements software lockout coordination between the process control system and the asset management system in accordance with the present claims.

Referring now to FIG. 1, an example process plant 10 includes an integrated system for coordinating software lockout between a process control system and an asset management system within the plant environment. Generally, the process plant 10 includes a distributed process control system (also known as a "distributed control system" or "DCS") having one or more process controllers 12, each of which may include a pair of redundant controllers. Each process controller 12 is connected to one or more field devices 14, 15, and 16 via input/output (I/O) cards or devices 13, 18 and 19, which may be any types of I/O devices conforming to any desired communication or controller protocol. The field devices 14, 15, and 16 may be any types of field devices such as, for example, sensors, valves, transmitters, positioners, etc., and may conform to any desired open, proprietary, or other communication or programming protocol.

The process plant 10 also includes one or more user interfaces or computers 20, 22 (which may be any types of personal computers, workstations, etc.) that are accessible by plant personnel such as configuration engineers, process control operators, maintenance personnel, plant managers or supervisors, etc. A communication line or bus 24, which may be implemented using any desired hardwired or wireless communication structure, and using any desired or suitable communication protocol such as, for example, an Ethernet protocol, couples the workstations 20, 22 to the process controllers 12. The process controllers 12, the I/O devices 13, 18, 19, and the field devices 14, 15, 16 generally make up a process control system (alternately known as a "distributed control system" or "DCS").

In addition, a database 28 may be connected to the communication bus 24 and operates as, or in cooperation with, a data historian that collects and stores configuration information as well as online process parameter, status, and other data associated with the process controllers 12 and field devices 14, 15, 16 within the process plant 10. The database 28 may operate as a configuration database to store the current configuration, including process control modules, as described below, as well as control configuration information for the process control system within the plant 10 as downloaded to and stored within the process controllers 12 and the field devices 14, 15, 16.

The distributed nature of the control system allows the components of the control system to be located in physically diverse locales. For example, while the process controllers 12, I/O devices 13, 18, 19, and field devices 14, 15, 16 are typically located down within and distributed throughout the sometimes harsh plant environment, the workstations 20, 22, and the database 28 are usually located in control rooms or other less harsh environments easily accessible by operators, maintenance personnel, etc.

As is known, the process controllers 12, which may be, for example, the DeltaV™ and Ovation™ controllers sold by Emerson Process Management, store and execute a controller application that implements a control strategy using a number of different, independently executed, control modules or blocks 29. The control modules 29 may each be made up of what are commonly referred to as function blocks, wherein each function block is a part or a subroutine of an overall control routine and operates in conjunction with other function blocks (via communications called links) to implement process control loops within the process plant 10.

Each of the function blocks, which may be an object in an object-oriented programming protocol, typically performs one of an input function, such as that associated with a transmitter, a sensor, or other process parameter measurement device, a control function, such as that associated with a control routine that performs PID, fuzzy logic, etc. control, or an output function, which controls the operation of some device, such as a valve, to perform some physical function within the process plant 10. Of course, hybrid and other types of complex function blocks exist such as model predictive controllers (MPCs), optimizers, etc. It is to be understood that while the Fieldbus protocol and the DeltaV™ system protocol use control modules 29 and function blocks designed and implemented in an object-oriented programming protocol, the control modules 29 may be designed using any desired control programming scheme including, for example, sequential function blocks, ladder logic, etc., and are not limited to being designed using function block or any other particular programming technique.

In the process plant 10 illustrated in FIG. 1, the field devices connected to the process controllers 12 may be conventional (i.e., non-smart) field devices 14 such as, for example, standard 4-20 mA devices that communicate over analog lines to the I/O device 13. Alternatively, or in addition, the field devices 14, 15, 16 may be smart field devices having a processor and a memory such as, for example, HART®, PROFIBUS®, Ethernet, or Fieldbus field devices, which communicate over a digital bus to the I/O devices 13 or 18 and 19, using HART or Fieldbus protocol communications, respectively. The Fieldbus smart field devices 15, 16 may store and execute modules or submodules such as function blocks 30A and 30B associated with the control strategy implemented in the process controllers 12. A processor may execute function blocks 30A and 30B, which FIG. 1 illustrates as disposed, respectively, in one of the Fieldbus field devices 15 and 16, in conjunction with the execution of the control modules 29 within the process controllers 12 to implement process control. In some embodiments, the I/O devices 13, 18, and/or 19 may also store and execute function blocks. The field devices 14, 15, 16 may be any types of devices, such as sensors, valves, transmitters, positioners, etc., and the I/O devices 13, 18, 19 may be any types of I/O devices conforming to any desired communication or controller protocol such as HART®, PROFIBUS®, Fieldbus, etc.

The process plant 10 also includes various rotating equipment 21 such as, for example, turbines, motors, etc. connected to the communication bus 24. Similarly, power generating and distribution equipment 25 associated with the process plant 10 may also be connected to the communication bus 24. Other equipment and process control devices may be attached to or be part of the process plant 10, and the system described herein is not limited to the equipment specifically illustrated in FIG. 1, but may, instead or in addition, include any other types of process control equipment or devices.

In the process plant 10 of FIG. 1, the workstation 20 includes a plurality of applications and other data structures 32, which any authorized user such as, for example, a configuration engineer, a process operator, a maintenance technician, a plant manager or supervisor, etc., may access to view information and provide functionality with respect to devices, units, equipment, etc. located within the process plant 10. A computer readable memory 34 in the workstation 20 stores the plurality of applications 32, and each of the applications or entities within the plurality of applications 32 is adapted to be executed on a processor 36 associated with the workstation 20.

Figure 2:
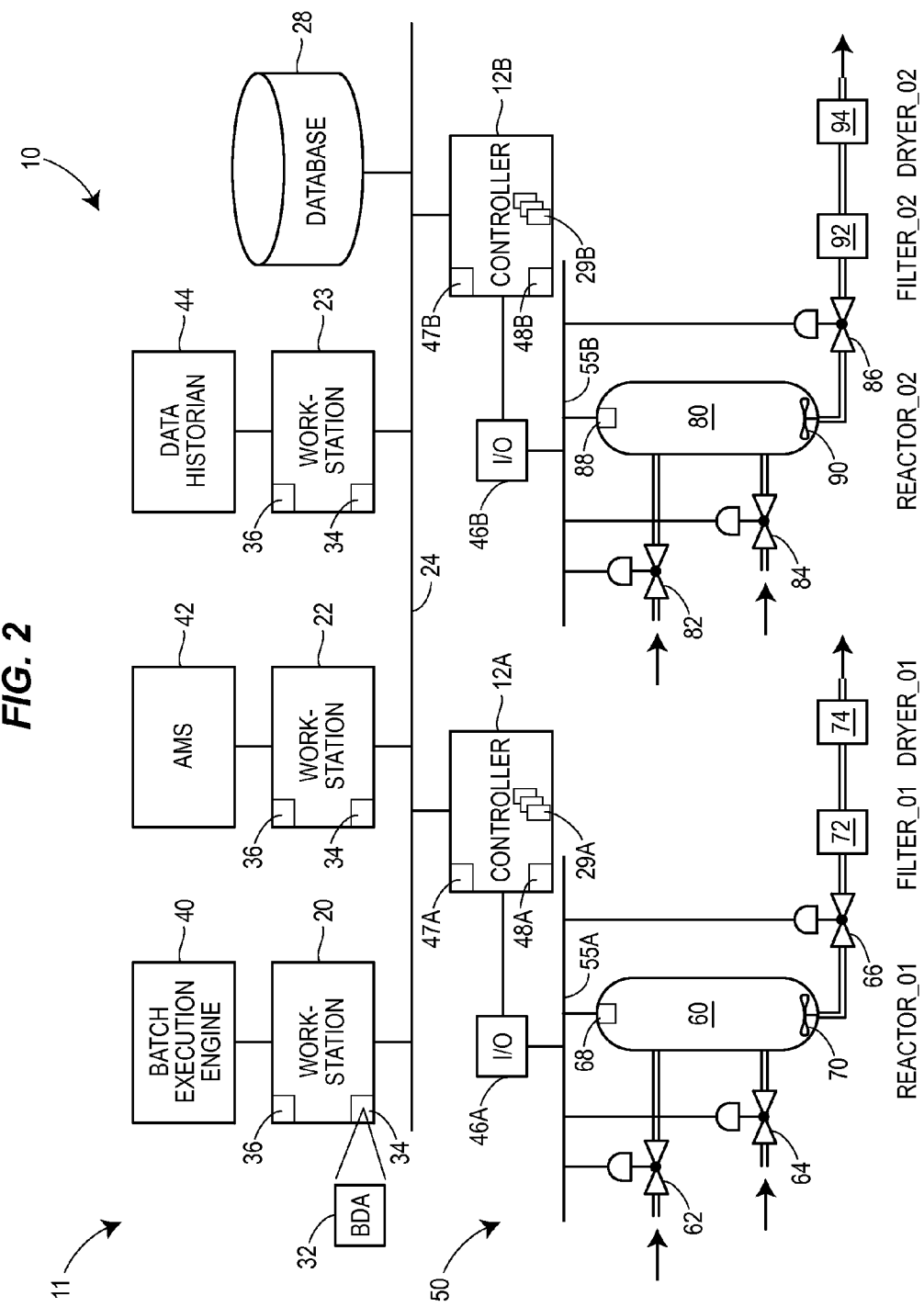
FIG. 2 is a block diagram illustrating an exemplary implementation of a process control system employed in a process plant.

While FIG. 2 illustrates the entire plurality of applications 32 as stored on the same workstation 20, other workstations or computer devices within or associated with the process plant 10 such as, for example, the workstation 22 may store and/or execute some of these or other applications. Furthermore, the individual applications within the plurality of applications 32 may be broken up and executed on two or more computers or machines and may be configured to operate in conjunction with one another. For example, the workstation 20 may be dedicated to functionality reserved for a process operator (e.g., through an application such as DeltaV™ Operate in a software suite such as DeltaV™, manufactured by Emerson Process Management), while the workstation 22 may be dedicated to functionality reserved for a maintenance technician (e.g., through software such as Asset Management Solutions Suite, also manufactured by Emerson Process Management).

The workstation 20 may further include user interface routines or applications 35 that receive and display information pertaining to the process plant 10 (or entities within or associated with the process plant 10) on a display screen 37 or display device associated with the workstation 20 such as, for example, a handheld device, laptop, other workstation, printer, etc. As described in more detail below, the user interface applications 35 may generate one or more user displays, such as, for example, operator, maintenance, and manager displays that enable a user to view and/or retrieve relevant information about different portions of the process plant, and that enable a user to graphically browse or navigate to different portions of the process plant in a desired manner based on depictions or displays of process control areas, units, loops, devices, etc. within the process plant 10.

The process control system is described with reference to FIG. 2, which illustrates an exemplary implementation of a process control system 11 (i.e., a DCS), employed in the process plant 10 and implementing an example batch process using devices and process equipment 50 in the process plant 10. The process control system 11 includes the process controllers 12A, 12B coupled to workstations 20, 22, 23 via the local area network (LAN) 24 which, in this example, implements an Ethernet communications protocol. One or more I/O devices 46A, 46B and a set of communication lines and/or buses 55A, 55B couple the controllers 12A, 12B to the devices and equipment 50 within the process plant 10. The controllers 12A, 12B operate to communicate with control elements, such as field devices and function blocks within field devices, distributed throughout the devices and equipment 50 in the process plant 10 to perform one or more process control routines to thereby implement desired control of the process plant 10. These process control routines may be continuous process control routines, but are described herein as batch process control routines or procedures. Engineers, operators, or other users use the workstations 20, 22, 23 to design and execute one or more process control routines for execution by the processor 48 in the controllers 12A, 12B, to communicate with the controllers 12A, 12B so as to download such process control routines, to receive and display information pertaining to the devices and equipment 50 in the process plant 10 during operation of the process plant 10, and to otherwise interact with the process control routines executed by, for example, the controllers 12A, 12B.

The applications 32 in the memory 34 of each of the workstations 20, 22, 23 include applications which may, among other things, enable a user to design process control routines such as batch control routines and to download those process control routines to the controllers 12A, 12B. Likewise, each of the controllers 12A, 12B includes a memory 47A, 47B for storing configuration data and process control routines to be used to control the equipment 50 in the process plant 10 and includes a processor 48A, 48B that executes the process control routines to implement a process control strategy. Each of the controllers 12A, 12B, in conjunction with one or more applications 32 on one of the workstations 20, 22, 23 may provide to a user a graphical depiction of the process control routines within the controllers 12A, 12B, illustrating the control elements within the process control routine and the manner in which these control elements are configured to provide control of the equipment 50 in the process plant 10. FIG. 2 depicts a batch execution engine 40 (described in more detail below) operating on the workstation 20, an asset management system (AMS) 42 (also described in more detail below) operating on the workstation 22, and a data historian 44, operating on the workstation 23. The data historian 44 may be connected to the LAN 24 and may automatically collect and store (e.g., in the database 28) data generated within the plant 10, including within the controllers 12A, 12B, the field devices and equipment 50, and even the workstations 20, 22, 23. Of course, any of the applications 32, including the batch execution engine 40, the AMS 42, and the data historian 44, may operate on any of the workstations 20, 22, 23 and, in fact, some of the applications (e.g., the batch execution engine 40 or the AMS 42) may operate on multiple workstations concurrently. Moreover, one or more of the applications 32 may be installed on multiple workstations such that a particular workstation may execute a given application (e.g., the AMS 42) when a particular user (e.g., a maintenance technician) logs into the workstation.

In the example distributed process control network 11 illustrated in FIG. 2, I/O devices 46A, 46B and buses 55A, 55B communicatively connect the controllers 12A, 12B to two sets of similarly-configured equipment, each set of equipment having a reactor unit referred to herein as Reactor_01 or Reactor_02, a filter unit referred to herein as Filter_01 or Filter_02 and a dryer unit referred to herein as Dryer_01 or Dryer_02. Reactor_01 includes a reactor vessel 60, two input valves 62, 64 connected so as to control fluid inlet lines providing fluid from, for example, a headtank (not shown) into the reactor vessel 60 and an output valve 66 connected so as to control fluid flow out of the reactor vessel 60 via an outlet fluid line. A device 68, which can be a sensor, such as a temperature sensor, a pressure sensor, a fluid level meter, etc., or some other equipment such as an electrical heater or a steam heater, is disposed in or near the reactor vessel 60, and an agitator 70 is also disposed in the reactor vessel 60. The valve 66 couples Reactor_01 to Filter_01 having filter equipment 72 which, in turn is coupled to Dryer_01 having dryer equipment 74. Similarly, the second set of equipment includes Reactor_02 which has a reactor vessel 80, two input valves 82, 84, an output valve 86, a device 88, and an agitator 90. Reactor_02 is coupled to Filter_02 having filter equipment 92 which, in turn, is coupled to Dryer_02 which has dryer equipment 94. The filter equipment 72, 92 and the dryer equipment 74, 94 may have additional control elements (such as heaters, conveyor belts and the like), sensors, etc. associated therewith. If desired, although not shown, each of the filter units Filter_01 and Filter_02 may be physically coupled to each of the reactor units Reactor_01 and Reactor_02 while each of the dryer units Dryer_01 and Dryer_02 may be coupled to each of the filter units Filter_01 and Filter_02 so that a batch run using one each of a reactor, a filter, and a dryer may use any combination of the equipment illustrated in FIG. 2.

As illustrated in FIG. 2, the buses 55A, 55B couple the controllers 12A, 12B to the valves 62, 64, 66, 82, 84, 86, to the devices 68, 88, to the agitators 70, 90, to the filter equipment 72, 92 and to the dryer equipment 94, 94 (and to the other equipment associated therewith) to control the operation of these elements (which may be units, field devices, etc.) to perform one or more operations with respect to these elements. Such operations may include, for example, filling the reactor vessels or dryers, heating the material within the reactor vessels or dryers, dumping the reactor vessels or dryers, cleaning the reactor vessels or dryers, operating the filters, etc. Additional busses or dedicated communication lines (e.g., 4-20 mA lines, HART communication lines, etc.), may couple each of the controllers 12A, 12B to the elements within the process plant 10

The valves, sensors and other equipment 50 illustrated in FIG. 2 may be any desired kind or type of equipment including, for example, Fieldbus field devices, standard 4-20 mA field devices, HART field devices, etc. and may communicate with the controllers 12A, 12B using any known or desired communication protocol such as the Fieldbus protocol, the HART protocol, the 4-20 mA analog protocol, etc. Still further, the controllers 12A, 12B may connect and/or may control other types of devices in any desired manner. Also, the Ethernet communication line 24, for example, may connect other controllers to the controllers 12A, 12B and to the workstations 20, 22, 23 to control other devices or areas associated with the process plant 10 and the operation of such additional controllers may be coordinated with the operation of the controllers 12A, 12B illustrated in FIG. 2 in any desired or known manner.

Generally speaking, the process control system 11 of FIG. 2 may implement batch processes in which, for example, one of the workstations 20, 22, 23 executes a batch execution application that implements and possibly coordinates different batch runs within the process plant 10. Such a batch execution engine 40 is illustrated as being stored in the memory 34, and run on the processor 36 of the workstation 20 in FIG. 2, it being understood that the batch execution engine 40 could be stored in and executed in other workstations 22, 23 or in other computers communicatively connected to the bus 24 in any desired manner, including in any wireless manner. Likewise, if desired, the batch execution engine 40 may be divided into various components or be associated with various components stored in and executed in different computers or workstations within the process plant 10.

The batch execution engine 40 is generally a high-level control routine, and may include what is commonly referred to as a batch campaign manager that enables a user, such as a process operator, to specify a number of batch runs to be performed within the process plant and that sets up a number of different batch runs or batch processes to operate essentially independently within the process plant control network 11. The batch execution engine 40 may also include batch executive routines or applications, which implement and oversee the different batch runs specified by the campaign manager. Each such batch run directs the operation of one or more procedures, unit procedures, operations, phases and other sub-divisions of a batch, each of which may be a sub-routine or a process that operates on a single unit, such as one of the reactor units, the filter units, the dryer units, or other equipment 50 within the process plant 10. In this example, each unit procedure (which is a part of a batch run that is generally run on one of the workstations 20, 22, 23) may perform a series of operations, each of which may perform one or more phases on a physical unit. For this discussion, the terms phases, operations, unit procedures, and procedures are meant to refer to these procedural elements, a phase being the lowest level action or step performed on a unit and being typically implemented or executed in one of the controllers 12A, 12B, an operation being a set of phases that performs a particular function on the unit and being typically implemented or executed on one of the workstations 20, 22, 23 by calling a series of phases within the controllers 12A, 12B, and a unit procedure being a series of one or more operations performed on a single unit and being typically implemented as a set of operation calls on one of the workstations 20, 22, 23. Likewise, a procedure is a set of unit procedures which may be performed on, for example, different physical units within the process plant 10. As a result, any procedure can include one or more unit procedures, and any unit procedure can include one or more phases and/or one or more operations. In this manner, each batch process performs different steps or stages (e.g., unit procedures) needed to produce a product, such as a food product, a drug, etc.

As those of ordinary skill in the art will understand, the same phases, operations, unit procedures, and procedures of a generic batch process can be implemented on each of the different reactor units of FIG. 2 at the same or at different times as part of different actual batch processes or batch runs. Furthermore, because the reactor units of FIG. 2 generally include the same number of and types of equipment (i.e., they belong to the same unit class), the same generic phase control routine for a particular phase may control each of the different reactor units, except that this generic phase control routine must be modified to control the different hardware or equipment associated with the different reactor units. For example, to implement a fill phase for Reactor_01 (wherein the vessel 60 is filled), a fill control routine will open one or more of the input valves 62 or 64 for a certain amount of time, for example, until the fluid level meter 68 senses that the vessel 60 is full. However, the system may use this same control routine to implement a fill phase for Reactor_02 by merely changing the designation of the input valve(s) to operate the valves 82 or 84 instead of the valves 62 or 64 and by changing the designation of the fluid level meter to monitor the fluid level meter 88 instead of the fluid level meter 68. The logic associated with the general operation of batch runs is known and will not be further described herein.

Figure 3:
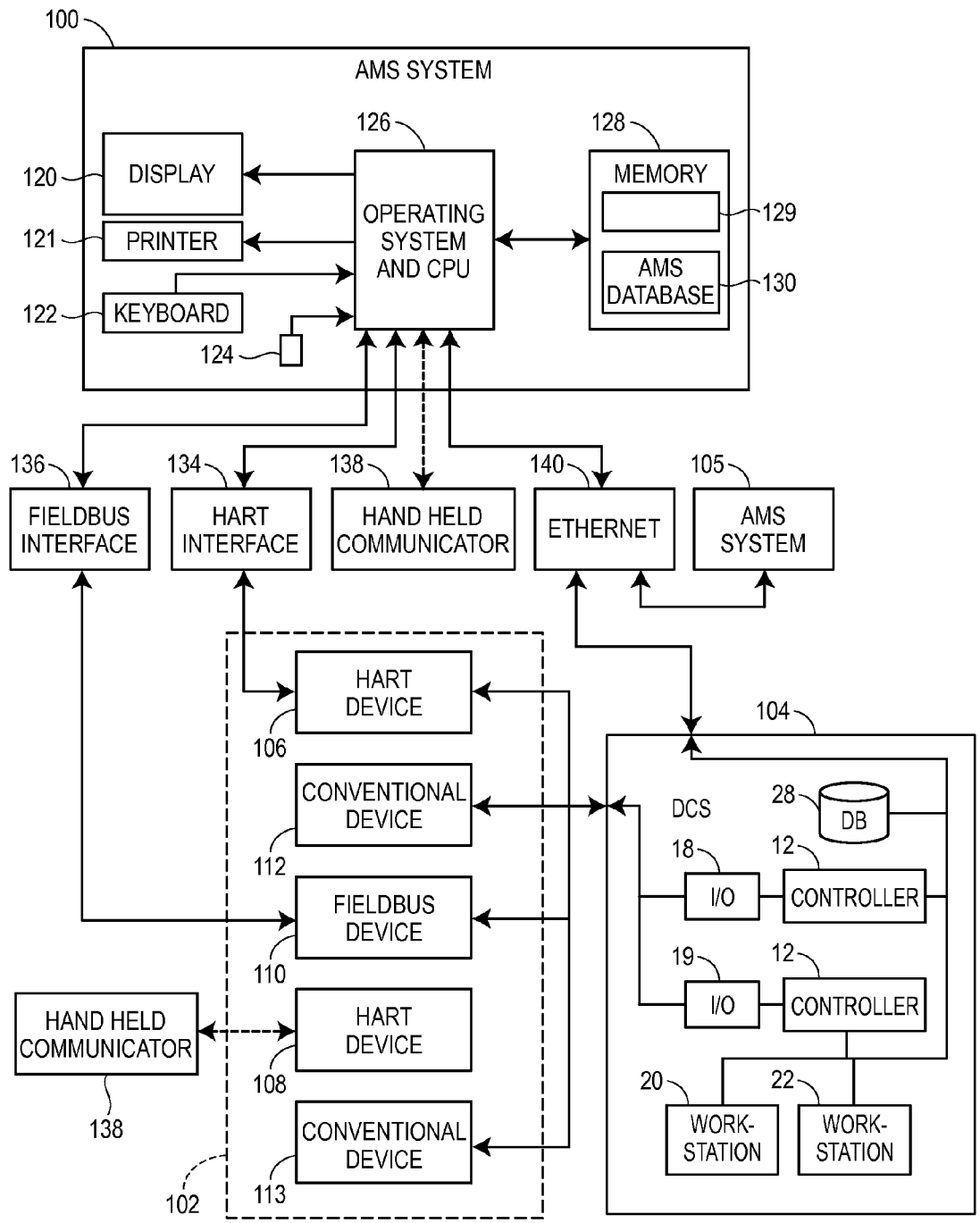
FIG. 3 is a block diagram illustrating the interconnections between a process, a distributed control system, and an asset management system configured according to the present claims.

FIG. 3 illustrates an asset management system 100, such as the AMS 42 described with reference to FIG. 2. The AMS 100 is interconnected with a process 102, such as the process including equipment 50 in FIG. 2, and a distributed control system (DCS) 104, such as the DCS 11 of FIG. 2. The DCS 104 may include the controllers 12, such as a DeltaV™ controller, which controls the process 102, and may further include the I/O devices 18, 19, the workstations 20, 22, the database 28, and a further management system such as another AMS 105. The process 102 may comprise any desired type of process, such as a manufacturing or refinery process, and is illustrated as including three smart field devices, comprising two HART devices 106, 108 and a Fieldbus device 110. The process 102 also includes two conventional (i.e., non-smart) field devices 112, 113. The DCS 104 controls the devices 106, 108, 110, 112, 113 in any desired manner.

Generally, the AMS 100 is a PC-based tool that includes software applications which perform field-device management tasks. The AMS 100 integrates device management for each of the devices within the process 102 by helping users to, for example, configure, calibrate, monitor, and troubleshoot any and all of the smart field devices or other equipment associated with the process 102 and to account for the status of the conventional devices within the process 102. This may include, for example, monitoring, troubleshooting, calibrating, and configuring any of the field devices or equipment in the process plant 10 of FIG. 1, including the rotating equipment 21 and the power generation and distribution equipment 25.

The AMS 100, which may comprise any type of computer or microprocessor based system, such as any of the workstations 20, 22, 23, is illustrated as including a display 120, a printer 121, a keyboard 122, and a mouse 124 connected to an operating system and CPU 126. A memory 128, coupled to the operating system and CPU 126, stores a set of AMS applications 129 and has an AMS database 130. The memory 128 stores software and data used by the AMS 100 to perform tasks related to displaying information to a user via the display 120 or the printer 121 and communicating with the smart devices 106, 108, 110. In addition, the AMS database 130 stores device-related information which is not available from the smart devices, for example, information pertaining to past configurations of the devices, information pertaining to the conventional devices 112, 113, and other off-line devices, such as off-line smart devices, and information pertaining to service notes including when the next service is needed, when calibration should be performed, who performed service procedures, any favored replacement devices, etc. The database 130 may store data pertaining to off-line smart devices, the data stored in a format identical to the format in which that data is actually stored within off-line smart devices so that, to the AMS 100, off-line devices appear to be available through the database 130 in essentially the same way that they would be available if those devices were on-line. Likewise, the database 130 may store data pertaining to conventional devices, the data stored in a format identical to the format in which that data would be stored in a comparable smart device so that, to the AMS 100, conventional devices appear to be off-line smart devices. Moreover, the data in the AMS database 130 may be duplicative, in whole or in part, of data stored by the data historian 44 (or other application) in the database 28.

As illustrated in FIG. 3, the various smart devices 106, 108, 110, may be on-line devices (e.g., the smart devices 106 and 110) or off-line devices (e.g., the smart device 108). Moreover, a communication line 132 and a modem 134 (e.g., the smart device 106) may connect each of the on-line devices 106, 110, to the AMS 100 or a Fieldbus interface 136 such as the I/O device 18 (e.g., the smart device 110) may connect the on-line devices 106, 110 to the AMS 100. The smart device 108 is an off-line device which is not permanently connected to the AMS 100. However, the smart device 108 may communicate with the AMS 100 via a hand-held communicator and/or secondary (laptop) AMS 138 which may be periodically connected to the smart device 108 and/or any of the other smart devices to read data from, and write data to, these smart devices. Thereafter, the hand-held communicator and/or secondary AMS 138 may be connected to the AMS 100 to upload data pertaining to the smart devices to which it was attached. Alternatively, or additionally, an Ethernet communication link 140 and/or any other network link to the DCS 104 and/or other AMSs, such as the AMS 105, may connect the various smart devices 106, 108, 110 to the AMS 100.

The AMS applications 129 stored on the memory 128 may include core applications, which are essentially programs written by the AMS provider to perform predetermined and frequently-used operations, and may include add-on applications 156, which are applications developed by a user or a third-party developer and imported to the AMS 100 to perform customized functions. Core applications may include, for example, applications that allow a user to interact with the data within the AMS database 130 and/or the smart devices within the process 102 to view the present state of one or more of the devices within the process 102, to change the configuration of one or more of the devices within the process 102, to view multiple devices in a simultaneous or sequential manner, to perform common smart device control and configuration functions, to run browsers that locate devices on the network, to monitor the status of devices and generate alarm lists, and to implement device calibration and testing routines. Other typical core applications may include configuration applications, configuration management applications, alarm scanning applications, history event-log applications, reporting applications, trend-analysis applications, and diagnostic applications.

The AMS 100 and the DCS 104 may each communicate with online field devices, such as the valves 62, 64, and 66 depicted in the example process of FIG. 2, and with other online equipment, such as the filter equipment 72 and the dryer equipment 74 depicted in the example process of FIG. 2. The forms of the various communications, also referred herein as messages, depend, in large part, on what communication standard the device employs (e.g., Fieldbus, HART, etc.) and on the device function. Moreover, the available data that may be gathered by the device, passed to and/or from the device to the AMS 100 or the DCS 104, and the available commands and functions that may be transmitted to and/or executed on the device, vary by the communication standard employed, the type of device, the device manufacturer, options installed on the device, function blocks configured and/or operating on the device, etc.

In any event, the presently disclosed system includes software lockout coordination between the AMS 100 and the DCS 104. The software lockout coordination provides means to control access to the various data, functions, and/or commands available and/or operating within the devices and equipment, and allows for the implementation of processes and procedures to eliminate, or at least mitigate, risk to personnel, destruction or loss of product, etc. For example, the system including lockout coordination may prevent a control operator from starting a turbine while a maintenance technician is lubricating the turbine's bearings, may prevent a technician from initiating a disruptive calibration cycle on a device while the DCS 104 is using the device to manufacture a product, may prevent an operator from using a device in a process if the device is scheduled for maintenance, etc.

Figure 4A:
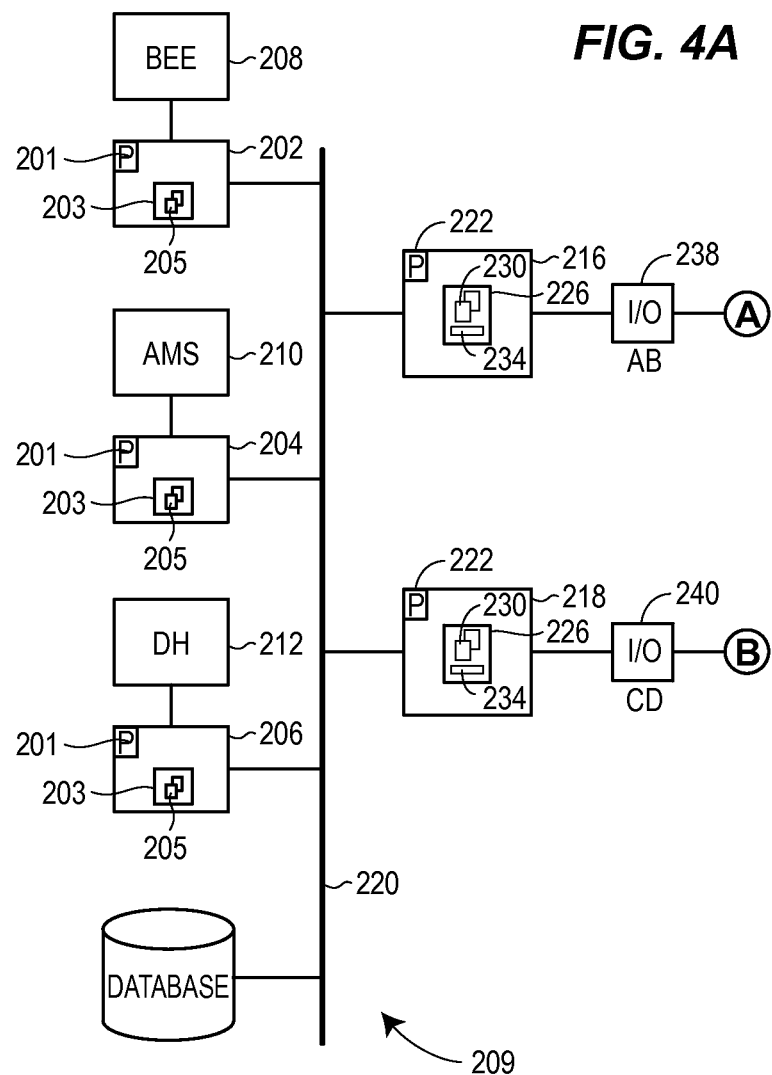
FIG. 4 is a block diagram depicting an exemplary batch process plant that may implement a software lockout coordination system.
Figure 4B:
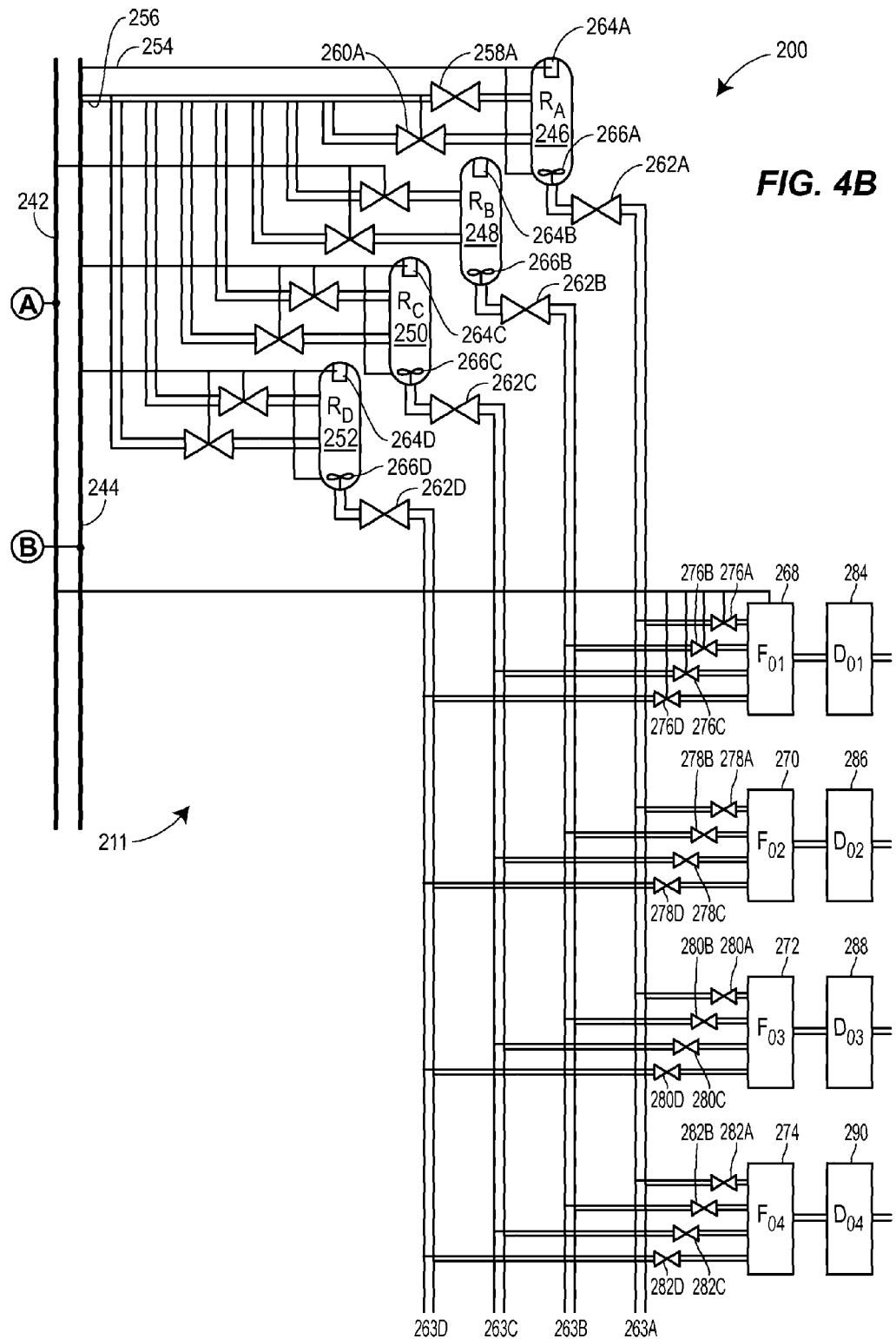

The features of a system including software lockout coordination are described with reference to FIGS. 4-8. FIG. 4 illustrates an exemplary batch process plant 200 including software lockout coordination. Generally, the process plant 200 may be divided into high-level control equipment 209 (e.g., workstations, controllers, I/O devices, etc.) and plant equipment 211 (e.g., valves, tanks, sensors, etc.). The process plant 200 includes three workstations 202, 204, 206. Each workstation includes a processor 201 and a memory 203 storing one or more applications 205 for execution by the processor 201 and various data 207 for use by the processor 201 while executing the applications 205. The applications 205 stored in the memory 203 may include a batch executive engine 208, an AMS 210, and a data historian 212, among other applications. In the system illustrated in FIG. 4, the workstation 202 executes the batch executive engine 208, the workstation 204 executes the AMS 210, and the workstation 206 executes the data historian 212. Each of the batch executive engine 208, the AMS 210, and the data historian 212 may be, but is not required to be, stored in the respective memory 203 of each of the workstations 202, 204, 206. It is possible, for example, that the workstation 206 is dedicated solely to executing the data historian application 212 and, therefore, no other applications are stored in the memory 203 of the workstation 206. Likewise, it is possible that the workstations 202, 204 are used interchangeably for performing process control duties (e.g., by a process operator) and maintenance duties (e.g., by a maintenance technician) and, therefore, the memories 203 of the workstations 202, 204 each store both the batch execution engine 208 and the AMS 210.

A digital network 220, which may be, for example, an Ethernet network, communicatively connects the workstations 202, 204, 206 to each other, to a database 214, and to any other equipment or workstations connected to the network 220. The database 214 may store current configuration data related to the field devices and other plant equipment 211 operating in the process plant 200, may store previous configuration data related to the field devices and plant equipment 211 operating in the system 200, may store online operating information related to the processes occurring in the process plant 200, may store function blocks related to or used in the process plant 200, may store other plant data (e.g., personnel data, batch queues, etc.), may store information related to the implementation of software lockout coordination, etc. As such, any of the applications 205 executing on the workstations 202, 204, 206 may, through the network 220, access (e.g., read, write, copy, etc.) the various data stored on the database 214. For example, the batch execution engine 208 may retrieve from database 214 information about the field devices and plant equipment 211 that are currently in use or scheduled to be used, as well as information about what batches currently exist in a batch queue stored in the database 214 and information and/or status of currently executing processes. The batch executive engine 208 may cause some of all of the retrieved information to be displayed to a process operator, who may then schedule additional batches, cancel scheduled batches, reallocate field devices and equipment, monitor currently executing processes, etc. The batch executive engine 208 may also write to the database 214 any changes (e.g., to the batch queue) implemented by the process operator. Like the batch executive engine 208, the AMS 210 may also read from, write to, and/or copy data to/from the database 214. The data accessible to the AMS 210 may be the same data as that accessible to the batch executive engine 208, may be different data than that accessible to the batch executive engine 208, or may be some combination of the same data and different data accessible to the batch executive engine 208. For example, like the batch executive engine 208, the AMS 210 may access current and/or prior configuration data related to the various field devices and equipment 211 in the process plant 200. But the AMS 210 may also retrieve information related to maintenance (e.g., dates on which devices were last serviced and/or calibrated, calibration data, alarm data, etc.). Moreover, the AMS 210 may cause the various devices and equipment 211 in the process plant 200 to perform functions that the batch executive engine 208 could not (e.g., executing calibration routines, self-diagnostic routines, etc.). The data historian 212 may write data to the database 214 in accordance with the data collection and storage scheme with which the data historian is programmed.

The network 220 also connects two controllers 216, 218 to the workstations 202, 204, 206. Like the controllers 12A, 12B described with reference to FIG. 2, the controllers 216, 218 include a processor 222 and a memory 226, and the memory 226 stores a plurality of function blocks and other software modules 230 for operating the various field devices and plant equipment 211 in the process plant 200. The memory 226 in the controller 216 also stores a pass-through message handler (PTMH) routine 234. The PTMH routine 234 (described in more detail below) acts as an interface between the AMS 210 and the process control system (e.g., the DeltaV system), and allows the AMS 210 to interface with (i.e., send messages to and receive messages from) the field devices and equipment 211 connected to the system.

The controllers 216, 218 are communicatively connected to the I/O devices 238, 240, respectively, which, via the busses 242, 244, respectively, serve as interfaces between the controllers 222, 224 and the field devices and process equipment 211. The field devices and process equipment 211 include four sets of similarly-configured equipment, each set including a reactor 246, 248, 250, 252, a filter 268, 270, 272, 274, a dryer 284, 286, 288, 290, and various field devices (e.g., valves 258, 260, 262, 276, 278, 280, 282, sensors 264, and agitators 266) for controlling the flow of materials to, from, and within the equipment. For example, a reactant X inlet valve 258A controls the flow of a reactant X from a Reactant X Supply 254 into Reactor_A 246, while a reactant Y inlet valve 260A controls the flow of a reactant Y from a Reactant Y Supply 256 into Reactor_A 246. A level sensor 264A determines the level of reactants in Reactor_A 246, while an agitator 266A may be used to mix the contents of Reactor_A 246. An outlet valve 262A allows the mixture to move out of Reactor_A and into a conduit (e.g., a pipe) 263A. In a similar manner, the valves 258B and 260B cooperate with Reactor B 248, the level sensor 264B, the agitator 266B, the outlet valve 262B, and the conduit 263B, the valves 258C, 260C cooperate with Reactor_C 250, the level sensor 264C, the agitator 266C, the outlet valve 262C, and the conduit 263C, and the valves 258D, 260D cooperate with Reactor_D 252, the level sensor 264D, the agitator 266D, the outlet valve 262D, and the conduit 263D. Meanwhile, each of the filters 268, 270, 272, 274 (referred to as Filter_01, Filter_02, Filter_03, and Filter_04, respectively) is connected in fluid flow communication with each of the conduits 263A, 263B, 263C, 263D via filter inlet valves 276, 278, 280, 282. For example, a valve 276A controls flow of fluid into Filter_01 268 from the conduit 263A, a valve 276B controls flow of fluid into Filter_01 268 from the conduit 263B, a valve 276C controls flow of fluid into Filter_01 268 from the conduit 263C, a valve 276D controls flow of fluid into Filter_02 268 from the conduit 263D, a valve 278A controls flow of fluid into Filter_02 from the conduit 263A, a valve 280B controls flow of fluid into Filter_03 from the conduit 263B, a valve 282C controls flow of fluid into Filter_04 from the conduit 263C, etc. Each of the filters 268, 270, 272, and 274 is paired with a respective dryer 284 (Dryer_01), 286 (Dryer_02), 288 (Dryer_03), 290 (Dryer_04).

Each of the controllers 216, 218 and the respective I/O devices 238, 240 controls a sub-set of the process control field devices and equipment 211. In the embodiment illustrated in FIG. 4, the controller 216, via the I/O device 238 and the bus 242, controls field devices and equipment associated with the Reactors A and B and Filters_01 and -_02 (e.g., the valves 258A, 258B, 260A, 260B, 276, 278, etc.). Likewise, the control 218, via the I/O device 240 and the bus 244, controls field devices and equipment associated with Reactors C and D and Filters_03 and -04 (e.g. valves 258C, 258D, 260C, 260D, 280, 282, etc.).

It will be appreciated that, in this arrangement, a batch run may utilize any of the reactors 246, 248, 250, 252 with any Filter-Dryer pair. For example, a batch recipe used by the batch executive engine 208 may include mixing two parts of reactant X with one part of reactant Y for five minutes, and then filtering and drying the mixture. To implement the recipe, the batch executive engine 208 may allocate available equipment for the batch run, and may upload appropriate function blocks to one or more controllers (e.g., the controllers 216, 218) to execute the batch run. A single controller may control the allocated equipment, as would be the case where the batch executive engine 208 allocates Reactor_A 246, and the Filter_01-Dryer_01 pair (i.e., the controller 216 controls all of the equipment associated with the Reactor_A 246, Filter_01 268, and Dryer_01 284), in which case the batch executive engine 208 sends all required information (e.g., procedures, function blocks, etc.) to the controller 216. Alternatively, multiple controllers may control the allocated equipment, as would be the case where the batch executive engine 208 allocates Reactor_B 248, and the Filter_04-Dryer_04 pair (i.e., the controller 216 controls equipment associated with Reactor_B 248, while the controller 218 controls equipment associated with Filter_04 274 and Dryer_04 290), in which case the batch executive engine 208 uploads a subset of required information to each of the controllers 216 and 218. In the latter case, the controller 216 may, via the I/O device 268 and the bus 242, send a message to the reactant x inlet valve 258B to open and allow reactant X to flow into Reactor_B 248 and, when the level sensor 264B detects (and reports to the controller 216) that Reactor_B 248 is filled to 50% capacity, the controller 216 may send a message to the reactant x inlet valve 258B to close and may send a message to the reactant Y inlet valve 260B to open and allow reactant Y to flow into Reactor_B 248. When the level sensor 264B detects (and reports to the controller 216) that Reactor_B 248 is filled to 75% capacity, the controller 216 may send a message to the reactant Y inlet valve 260B to close, and a message to the agitator 266B to turn on. Later, the controller 216 may send a message to the agitator 266B to cease operating, and may send a message to outlet valve 262B to open and allow the mixture to drain from Reactor_B 248 into conduit 263B. At the same time, the controller 218 may send a message to the Filter_04 inlet valve 282B instructing the valve 282B to open and allow the mixture to flow from conduit 263B into Filter_04 274 and, subsequently, into Dryer_04 290.

As described above, the embodiment of the process plant 200 depicted in FIG. 4 includes the PTMH routine 234 for routing messages and/or commands between the AMS 210 and the field devices and plant equipment 211. Although FIG. 4 illustrates the PTMH routine 234 as residing in the memory 226 of the controllers 216, 218, and may execute in the associated processor 222, the PTMH routine 234 could also be stored in a memory of one of the workstations (e.g., the memory 203 of the workstation 202). In other embodiments, the PTMH routine 234 may also route messages and/or commands between the distributed control system and the field devices and plant equipment 211 (i.e., between the workstation 202 running, for example, DeltaV software and the equipment 211, and/or between the process control applications and/or function blocks 230 and the equipment 211). In still other embodiments, the AMS 210 may operate to communicate with the equipment 211 by bypassing the controllers 216, 218 completely and communicating directly with the equipment 211 via the I/O devices 238, 240.

In any event, in the embodiment presently described with respect to FIG. 4, the AMS 210 sends messages via the PTMH routine 234 in order to write to a parameter or a property of a process control device or to send a command to a process control device (e.g., the valve 258A), or to poll or request information from the process control device (e.g., the sensor 264A). The PTMH routine 234 acts as a conduit for messages from the AMS 210, passing the messages to the appropriate I/O cards (e.g., the I/O card 238) and channels, and to the target device (e.g., the valve 258A). Messages sent from the AMS 210 may be "addressed" with the node or area in which the target device is located (i.e., the appropriate controller address), and the I/O card and channel of the target device in that node or area. Alternatively, messages sent from the AMS 210 may be "addressed" with a device tag (e.g., Filter_01_contA_IO1_5) that is associated with a node, an I/O card, and a channel. The association between the device tag and the information such as the node, the I/O card, and the channel for the specified device, may be stored in any accessible location on the system and, for example, may be stored in the configuration database 214, in a lookup table (not shown) in the memory 226 of the controllers 216, 218, in a lookup table or database (not shown) in one of the workstations 202, 204, 206, etc. Moreover, while each of the controllers 216, 218 may store a lookup table (not shown) relating all of the device tags to all of the "addresses" for the device tag, each of the controllers 216, 218 may alternatively store only the device tag and "address" information related to the devices connected to the particular controller.

Process operators and maintenance personnel associated with the process plant 200 may be located in different physical locations, and may perform respective process operations and maintenance operations using different ones of the workstations 202, 204, 206. For example, a first process operator responsible for the portion of the process plant 200 depicted in FIG. 4 may be logged into the workstation 202 in an operator control room that may be located adjacent to, or with a view of, the first process control area, while a second process operator responsible for a second process control area (not shown) may be logged into a second workstation in an operator control room that may be located adjacent to, or with a view of, the second process control area. A process control operator may be responsible for multiple process control areas, using one workstation or multiple workstations to control the various process control areas. Moreover, the workstation that a particular operator is logged into need not be adjacent to (or have a view of) the area of the process that the workstation is currently controlling. For example, a central control room located remotely from the process may include multiple workstations, each workstation controlling one or more areas of the process plant.

Meanwhile, a maintenance technician may be logged into the workstation 204 located at a different location from the operator workstation 202, such as in a maintenance facility. The maintenance technician may use the AMS 210 operating on the workstation 204 to receive alarms generated by various devices and equipment 211 in the process plant 200, or the AMS 210 may generate alarms based on information received from the process control system 209 or various of the process control devices and equipment 211 in the process plant 200. The maintenance technician may additionally use the AMS 210 to initiate self-diagnostic capabilities on the various process control devices and equipment 211, change parameters (e.g., set points, rotation speeds, reporting frequencies, etc.) in the devices and equipment 211, or take the devices (e.g., the valve 260B) off-line to perform other maintenance activities, such as lubrication, calibration, repair, and/or replacement.

Because the process operator and the maintenance technician may be located in physically different places, problems may arise if the maintenance technician attempts to alter a device configuration or take a device off-line to perform device maintenance or calibration. Optimally, a maintenance technician intending to perform maintenance activities on a process control device will contact the process operator responsible for the process area in which the device is located prior to changing the device configuration or performing other activities on or with the device, which activities could interfere with or otherwise affect the process (e.g., by taking off-line a device that the batch executive engine 208 has scheduled for use). Likewise, when a maintenance technician has completed maintenance activities on a device, the technician will, optimally, contact the operator responsible for the respective process area to confirm that the operator accepts responsibility for the operation of the device. However, these types of informal protocols are sometimes ignored, and reliance on such protocols may lead to various inefficiencies in the process plant, wasted materials, or even situations dangerous to personnel or equipment. For example, suppose an operator using workstation 202 configures a batch run of the material processed by the plant in FIG. 4. Also suppose that the operator (or the batch executive engine 208) assigns the batch run to be executed using Reactor_A 246 and the valves 258A, 260A, and 262A associated with Reactor_A 246, and uploads instructions to the controller 216 (i.e., to the controller that controls the assigned equipment) for execution by the controller 216. The instructions uploaded to the controller 216 include instructions for opening the valve 258A, filling Reactor_A 246 until the level sensor 264A transmits a value to the controller, which value indicates that Reactor_A 246 is 50% full, and then closing the valve 258A. However, suppose a technician fails to contact the operator before changing a calibration parameter on the level sensor 264A. The instructions uploaded to the controller 216 executing the process may cause the controller 216 to incorrectly interpret data from the sensor 264A, and may, for example, cause the controller 216 to allow Reactor_A 246 to fill to 65% of capacity before closing the valve 258A. The improper ratio of the fluids in Reactor_A 246 could result in wasted materials, as the batch run could yield an unusable product. Or, for example, suppose that the maintenance technician decides to replace the agitator 266A in the Reactor_A 246. Activation of agitator 266A or opening of either of the valves 258A or 260A could pose a risk to the safety of the technician if the controller 216 cannot determine that the Reactor_A 246 is unavailable because it is undergoing maintenance.

Referring now to FIG. 5, in some embodiments of the disclosed system, the PTMH routine 234 maintains a table 300 of assignment records 301-348 for each device. The table 300 includes a device identification column 349 identifying the device (by device tag, device address, etc.) with which the record is associated, and an assignment column 350 indicating whether each device is currently assigned to maintenance, such as in records 302, 308, 309, 314, and 339, or to process operations, as in the remaining records. The PTMH routine 234 then forwards messages according to the assignment record for each device, forwarding messages from the control system (i.e., from a controller 216, 218 or a workstation such as the workstation 202 at which the process operator is working) to a device only when the assignment record for the device indicates that the device is assigned to process operations, and forwarding select or all messages from the AMS 210 to the device only when the assignment record for the device indicates that it is assigned to maintenance operations. Thus, given the table 300 of FIG. 5, the PTMH routine 234 would forward messages and/or commands from a process operator using a control system operating on the workstation 202 to devices such as Reactor_A (record 301), Filter_01 (record 305), Filter_02 (record 306), Dryer_02 (record 310), Valve_258A (record 313), and Valve_260A (record 317), etc., but would not forward messages and/or commands from the process operator to devices such as Reactor_B (record 302) or Dryer_01 (record 309). Similarly, the PTMH routine 234 would forward some or all messages and/or commands from a maintenance technician using the AMS 210 operating on the workstation 204 to devices such as Reactor_B or Dryer_01, but would not forward messages sent from the maintenance technician to devices such as Reactor_D (record 304) or Filter_03 (record 307).

The implementation of software lockout coordination may affect more than merely messaging within the process plant 200. For example, in many instances, a process operator does not directly control the execution of a batch process. Instead, the process operator may direct the batch execution engine 208 operating on the workstation 202 to implement one or more batch runs. Each batch run may include information about the size of the batch, the batch recipe to use, when the batch must be complete, the relative priority of the batch, etc. The batch executive engine 208 may use the received information to schedule the batch run according to, for example, what equipment resources are available, what other batch runs are scheduled, the priorities of the various batch runs scheduled, when the required materials for the various batch runs will be available, etc. Thus, the software lockout coordination may also extend to the operation the batch execution engine 208, as the status of the various field devices and process equipment 211, as indicated by the table 300, determines what equipment is available on which to run the process. FIG. 4, for example, illustrates sufficient equipment to run four or more simultaneous batches of a recipe that for any given run requires one reactor and one pair of filter and dryer. However, as depicted in table 300 of FIG. 5, the assignment record 302 indicates that Reactor_B is unavailable, the pair of Filter_01 and Dryer_01 is unavailable because the assignment record 309 indicates that Dryer_01 is unavailable, and the pair of Filter_04 and Dryer_04 is unavailable because the assignment record 308 indicates that Filter_04 is unavailable. Thus, if the table 300 is as illustrated in FIG. 5, at any given time only three reactors and only two pairs of filters and dryers are available for use by the process control system.

In some embodiments, the batch executive engine 208 accesses the records 301-348 in the table 300 so that the batch executive engine 208 may facilitate equipment resource arbitration. The batch executive engine 208 may access the table 300 by, for example, reading from the table 300 maintained by the PTMH routine 234 in the memory 226 of the controller 216, by maintaining a copy of the table 300 in the memory 203 of the workstation 202, etc. Prior to assigning equipment for use during a batch run, the batch executive engine 208, in addition to determining what equipment is already in use (e.g., in use by a previously-scheduled batch run, or scheduled for use by a queued batch run that would conflict with the current batch run), may determine what equipment resources are unavailable because the resources are assigned to maintenance and not to operations. If the availability of a device (i.e., whether the device is assigned to operations or maintenance) changes after the batch executive engine 208 has uploaded instructions to the respective controller 216, 218, either the batch executive engine 208 must stop the process operating in the controller 216, 218, or the PTMH routine 234 in the controller 216, 218 must also have access to the new information contained in the table 300, so that messages from the process control system are not routed to devices assigned to maintenance. For example, if an operator schedules a batch run requiring one reactor (and associated valves, sensors, agitators, etc.) and one filter-dryer pair, in the batch executive engine 208, the batch executive engine 208 may look at the table 300 to determine which of the required resources are available. The table 300 depicted in FIG. 5 shows that Reactor_C 250 is available, as are the associated valves and sensors, and the associated agitator. However, if after scheduling the batch run and allocating Reactor_C 250 and the associated devices the operator receives a request to replace the level sensor 264C, it is possible that the operator could grant the request without realizing that the batch executive engine 208 has already allocated the requested device for use during a batch run. Thus, after the batch executive engine 208 has, presumably, uploaded the requisite instructions for the batch run to the associated controllers 216, 218, the availability of the level sensor 264C as indicated in the record 343 of the table 300 changes. In such an instance, not only does the batch executive engine 208 require access to the assignment record table 300 for the purpose of allocating process control equipment resources, but the PTMH routine 234 also requires access to the assignment record table 300 so that the PTMH routine 234 does not try to send messages from the AMS 210 to the level sensor 264C that is part of the scheduled batch run. In the event that a controller 216, 218 is unable to execute instructions uploaded to the controller 216, 218 by the batch executive engine 208 due to a change in the assignment of a device from operations to maintenance, as would be the case in this example, the controller 216, 218 may, for example, generate an alarm indicating that the batch run has failed. Alternatively, or additionally, the controller 216, 218 may coordinate the reassignment of equipment resources so that the batch run may continue and no materials are wasted.

In another embodiment, the PTMH routine 234 maintains a table 400 of assignment records 401-448, as depicted in FIG. 6. Like the table 300, the table 400 includes a device identification column 449 identifying the device (by device tag, device address, etc.) with which the record is associated, and an assignment column 450 indicating whether each device is currently assigned to maintenance, such as in records 402, 405, 409, 414, 418, 425-428, 439, 442, and 446, or to process operations, as in the remaining records. The table 400 also includes a technician column 451 indicating, for any device assigned to maintenance, to which technician the device is currently assigned. For example, each of records 402, 414, 418, 442, and 446 indicates in the assignment column 450 that the corresponding device is assigned to maintenance, and further indicates in the technician column 451 that the particular device is assigned to a technician associated with a value TECH 1. Likewise, each of records 405, 409, 425-428, and 439 indicates in the assignment column 450 that the corresponding device is assigned to maintenance, and further indicates in the technician column 451 that the particular device is assigned to a technician associated with a value TECH 2. The values populated in the technician column 451 may be any set of values chosen to represent the various technicians to whom devices may be assigned (e.g., technician names, employee identification numbers corresponding to the technicians, arbitrary values assigned to each technician, etc.). For convenience, the values populated in the technician column 451 are used throughout this specification to refer to the technicians associated with the values (i.e., TECH 1 refers to the maintenance technician associated with the value TECH 1, etc.).

A PTMH routine 234 acting in accordance with the table 400 only passes messages from the AMS 210 to a device (e.g., Reactor_B) if the message (or command, request, etc.) is sent by the technician to whom the device is assigned, as indicated in the corresponding record (e.g., record 402) of the table 400. In this manner, the system prevents an operator and/or a maintenance technician from interfering with, or otherwise sending commands to, a device that another maintenance technician is currently testing, updating, calibrating, repairing, etc. Implementing a scheme such as this may require that additional information be included in the message transmitted from the AMS 210 to the PTMH routine 234. In particular, the AMS 210 must include an indication of the maintenance technician currently logged into the workstation (e.g., the workstation 204) transmitting the message. For example, the technician column 451 of the record 405 in the table 400 indicates that Filter_01 268 is assigned to TECH 2, perhaps so that TECH 2 can replace a sensor (not shown) in Filter_01 268. In this example, if the PTMH routine 234 receives a message or command destined for Filter_01 268 from an operator (e.g., a command to run Filter_01 268), the PTMH routine 234 does not transmit the message to Filter_01 268 because the corresponding record (the record 405) in the table 400 indicates that Filter_01 268 is assigned to maintenance. Likewise, if the PTMH routine 234 receives a message or a command destined for level sensor 264B from TECH 2 (e.g., a command to calibrate the sensor 264B being replaced by TECH 1), the PTMH routine 234 does not transmit the message to the sensor 264B because the corresponding record (the record 442) in the table 400 indicates that the level sensor 264B is assigned to TECH 1. Instead, the PTMH could transmit and/or cause to be displayed a message to TECH 2 indicating why the command was not transmitted to the level sensor 264B (i.e., notifying TECH 2 that the device is locked out). The message could include various information including, for example, the current technician to whom the device is assigned, the expected duration of that assignment, etc.

In some embodiments of the system, a table of assignment records may include an additional field or fields indicative of an level of access given to a maintenance technician to whom a device is assigned. FIG. 7 illustrates an exemplary table 500, having assignment records 501-548. In addition to the device identification column 549, the assignment column 550, and the technician column 551, the table 500 includes a level column 552 for specifying the access level granted to the particular user or associated with the particular device. The access level feature could be implemented in various ways. For example, the value in the column 552 may be indicative of the access to the device allowed personnel other than the assigned technician (e.g., other maintenance technicians, operators, etc.). A value "0" may indicate, for instance, that the device is effectively cut off from access by any user other than the assigned technician. A value "1" may indicate, for instance, that any maintenance technician may access certain device parameters (but not others) but that the device is cut off from access by operators. A value "2" may indicate that, while the device is assigned to a specific technician, technicians and operators may still view the status of the device and/or query various parameters (but not change the parameters). In another example, the value in the column 552 may be indicative of the access to the device that is granted to the assigned maintenance technician. Thus, a value "0" may indicate that the maintenance technician has complete control over the device, and that no other user may communicate with the device, while a value "1" may indicate that the technician has only conditional control of the device and that an operator (or operation) may supersede the maintenance technician. In still another example, the value in the column 552 may be indicative of the specific operations or types of operations that the maintenance technician can perform. For instance, a value "0" may indicate that the assigned maintenance technician has access to send messages to read or poll values from the device, but that the system will prevent the assigned maintenance technician from taking the device off-line, changing the configuration of the device, calibrating the device, or otherwise making changes to the device. A value "1" may indicate that the assigned maintenance technician may configure certain parameters of device operation (i.e., to send certain write messages to the device), but that the system will prevent other write messages from the technician from reaching the device. A value "2" may indicate that the system will allow the technician full access to the device, causing the PTMH routine 234 to pass any message from the technician to the intended device. The value populated in the level column 552 may also be indicative of the maintenance that the technician is scheduled to perform. For example, a value "R" may indicate that the device is being replaced, a value "C" may indicate that the device is being calibrated, a value "P" may indicate that the device is scheduled for periodic maintenance (e.g., lubrication, seal replacement, etc.), the value "T" may indicate that the technician is going to troubleshoot an error in the device, etc. The values that populate the level column 551 need not be numbers, and may be associated with whatever control scheme is desired and/or appropriate in the process plant or with the control scheme implemented in the process plant. Moreover, the level column 552 may be implemented even in instances in which the assignment column 550 is not implemented, in which case access levels may not be technician-specific, but may simply define the relationship between maintenance personnel and operations personnel and/or define the access provided to various personnel. Further still, more than one access level scheme may be implemented at a time by adding additional columns to the assignment record table.

It will also be appreciated that there are instances in which it may be desirable that the status of one device affect the status of one or more other devices. For example, and with reference to FIG. 7, if Reactor_B 248 is assigned to TECH 1 to allow the technician to replace the associated level sensor 264B, it may be desirable to also disable the associated valves 258B and 260B, so that the valves 258B and 260B are not operated to allow Reactant X and Reactant Y, respectively, to flow from the supplies 254 and 256 into Reactor_B 248 while the technician is working on or within Reactor_B 248. To this end, in some embodiments changing the status of a device to "maintenance" may automatically result in a change of status for other devices, as defined by the designer of the process control system (or by process engineers, process operators, etc.) and, in embodiments in which devices are assigned to specific technicians, the assignment of a device to a specific maintenance technician may result in the assignment of other devices to the same maintenance technician. Moreover, the level column 552 may be populated in accordance with the relationship between a device selected for access by a maintenance technician and devices which status changed as a result of the selection of the device.

The table 500 of FIG. 7 illustrates how an embodiment employing this scheme may affect records related to two "sets" of related equipment. Each "set" of equipment may be defined according to any number of criteria or combinations of criteria including, for example, how the devices are connected or otherwise related electrically, how the devices are connected or otherwise related mechanically, how the devices are related with respect to the process, what maintenance task is being performed, etc. A "set" of devices may include devices in physical proximity to one another such that a technician performing a task on one device might be at risk if another device in physical proximity to the first is operated (e.g., where a rotating part or an actuator may be in physical proximity to an area in which the technician would be working). Alternatively, a "set" of devices may include devices in physical, electrical, or fluid connection to one another such that safely performing maintenance on one device is dependent on the states of other devices (e.g., safely performing maintenance inside a reactor tank requires that the valves controlling the input to the tank not allow the tank to be filled while the technician is in the tank). The devices included in a "set" may vary depending on what task the maintenance technician plans to perform. For example, a "set" may include the input valves to a reactor tank if the maintenance task involves being inside of the reactor tank, but may include only the reactor tank itself if the task does not include being inside of the reactor tank (e.g., when replacing a component located on the outside of the tank). Moreover, a device may be part of more than one "set" of devices.

Take first the "set" of devices depicted in FIG. 7 and including Reactor_B 248 (i.e., those devices assigned to TECH 1). Suppose, for example, that maintenance technician TECH 1 requested access to the level sensor 264B so that the device could be replaced, and that the request is granted. The record 542 for the level sensor 264B indicates in the status column 550 that the level sensor 264B is assigned to maintenance, and in the column 551 that the level sensor 264B is assigned to TECH 1. Also suppose that the value in the level column 552 indicates the type of maintenance operation that the technician will perform (i.e., that the value "0" in the level column 552 of the record 542 indicates part replacement). The system may also assign to TECH 1 the devices that are associated with the level sensor 264B and should not be operated for the safety of TECH 1 (e.g., Reactor_B 248, the valves 258B and 260B, and the agitator 266B) and may further assign a corresponding value in the level column 552 of the record corresponding to each of the devices associated with the level sensor 264B. Thus, each of records 502, 514, 518, and 546, also indicates that the associated device is assigned to TECH 1 in the column 551, and further indicates in the column 552 that the assigned level is "1," which may indicate, for example, that the device is disabled as a result of being part of a "set" of devices.

The records 505, 525-528, and 539 in the table 500 depicted in FIG. 7 may comprise a second "set" of devices. In the same manner as the example above, the record 505 indicates that TECH 2 requested access to FILTER_01 268 for the purpose of replacing the device. The associated "set" of devices would include the valves 276A, 276B, 276C, and 276D that control the inputs to FILTER_01 268. Thus, the records 525-528 corresponding, respectively, to the valves 276A, 276B, 276C, and 276D indicate in the level column 552 that the devices are disabled as a result of being part of the "set." The record 509 in the table 500 indicates (in the column 451) that DRYER_01 284 is also assigned to TECH 2, and indicates (in the column 452) that the level is "2," which may, for example, indicate that the technician will perform a calibration on the device.

Figure 8:
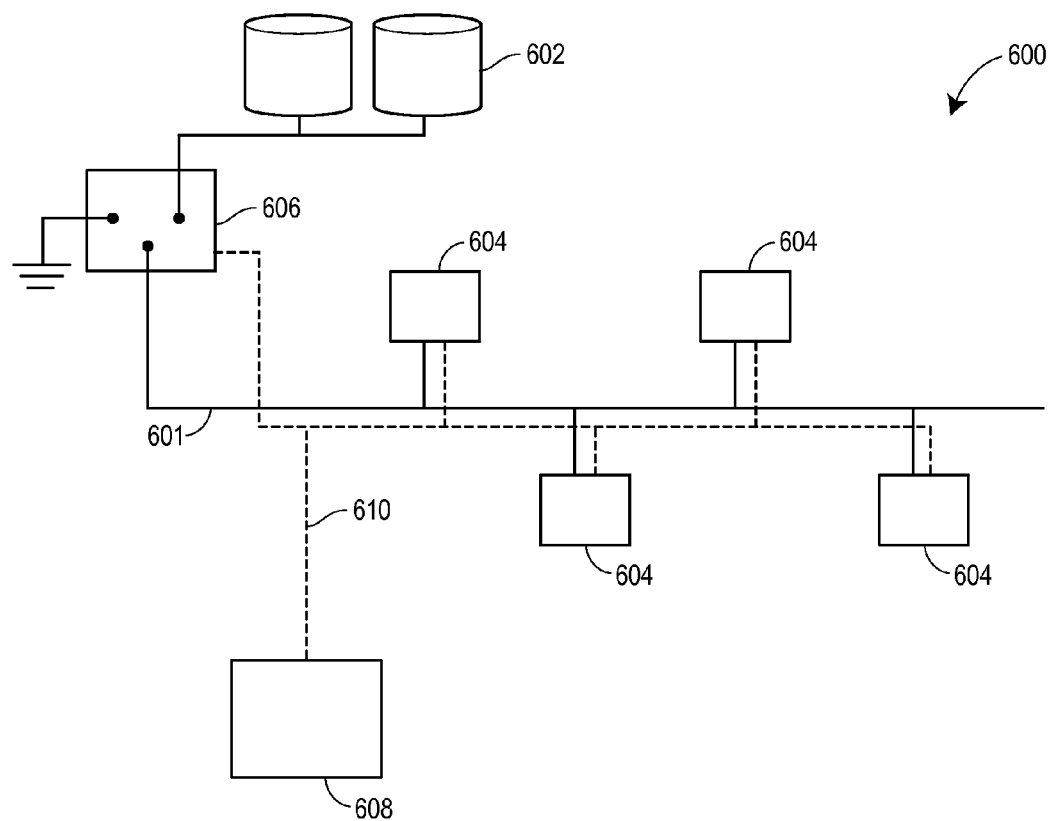
FIG. 8 illustrates a portion of a process plant having multiple process control equipment resources connected to an electrical bus.

Just as the presently described embodiments may enhance the safety of a maintenance technician performing a task on a particular device, some embodiments include provisions for a device to be assigned to more than one maintenance technician at a time. By doing so, the system may ensure the safety of multiple technicians who may be working concurrently on a piece of equipment or on a set of equipment. One instance in which the ability to associate multiple technicians with a device may prove beneficial is when performing maintenance on multiple devices attached to an electrical bus, as illustrated in FIG. 8. FIG. 8 depicts a portion of a process plant 600. The plant 600 includes an electrical bus 601 connected to a power source 602 (e.g., a generator, a power utility, etc.). Various devices 604 (e.g., motors, heaters, mixers, furnaces, etc.), which may be the same as or different from each other, are coupled to the electrical bus 600 through a circuit breaker 606, which serves to connect and/or disconnect the devices 604 from the power source 602. At least one workstation 608 includes software (not shown) for communicating with the devices 604 and the circuit breaker 606 through a communications network 610. The workstation 608 and the communication network 610, which may include other devices (e.g., controllers, I/O devices, etc.) cooperate to control the devices 604 and the circuit breaker 606 in accordance with the system described above including a PTMH routine 234 operating according to a table of assignment records such as those illustrated in FIGS. 5-7. Two or more maintenance technicians may perform maintenance tasks on the various devices 604 concurrently. However, the safety of each technician may depend on the circuit breaker 606 remaining in the "open" position (i.e., disconnecting the devices 604 from the power source 602). Thus, while in the table of assignment records there may be only a single maintenance technician associated with each of devices 604, an additional safety benefit may be realized by associating each of the technicians with circuit breaker 606, such that the circuit breaker 606 cannot be closed (and power restored to the devices 604) while any one of the technicians still relies on the circuit breaker 606 remaining open.

Regardless of whether the system implements user-specific access (i.e., assigns control of a device to a specific maintenance technician) as described above, the level of access granted to a maintenance technician may depend on the current status of the device and/or how the message may affect the process. This may be the case where, for instance, an embodiment of the system does not implement technician specific access, but implements an access level with respect to maintenance generally. The access level granted for a particular device, which access level may or may not be explicitly recorded in a table such as the table 500, may depend on the current status of the device. For example, the PTMH routine 234 may forward some messages (e.g., messages that do not affect the process) from the AMS 210 to a process control device even when the assignment record for the device does not indicate that the device is currently assigned to a maintenance technician, and may forward all messages from the AMS 210 to the process control device only when the assignment record for the device indicates that the device is currently assigned to the maintenance technician. Alternatively, the PTMH routine 234 may forward one type of messages from the AMS 210 to a process control device if the device is presently operating as part of a batch run, but may forward another type of messages from the AMS 210 to the process control device if the device is not presently operating as part of a batch run.

Figure 9:
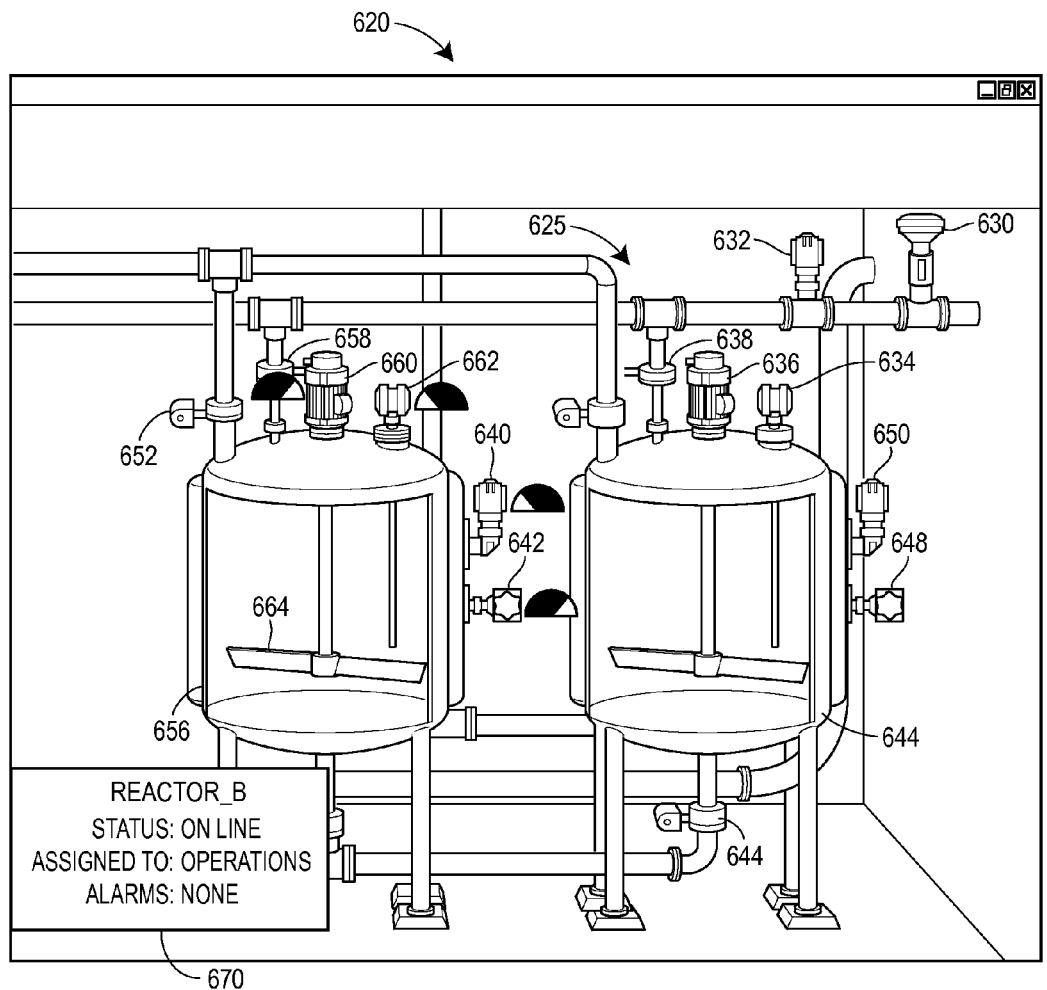
FIG. 9 depicts an exemplary device selection screen for use in a software lockout coordination system.

The description above describes the functionality and implementation of the various embodiments of a system having software lockout coordination. The means of interaction between the operator(s) and the maintenance technician(s) are described now with reference to FIGS. 9-12. The assignment of a process control device to maintenance, and in some embodiments to a specific maintenance technician, and/or with a specific access level, takes place as a result of a request initiated, in most cases, by a maintenance technician. The maintenance technician may, for example, activate a control on the AMS 210 (e.g., by clicking on a button on the display of the workstation 204) to allow the technician to select one or more devices for which to request control. The AMS 210 may allow the technician to select the one or more devices using any selection method known in the art. For example, FIG. 9 illustrates one embodiment of a device selection screen 620 that the AMS 210 may display to a technician. In the display depicted in FIG. 9, the AMS 210 may display the screen 620 including pictorial depiction 625 of the process plant, an area in the process plant, or an individual process unit in the process plant, which may include one or more displayed devices 630-664. The technician may select one or more of the displayed devices 630-664 by clicking on the devices 630-664 illustrated on the screen 620. Clicking on one of the devices 630-664 may cause the screen 620 to show the device as highlighted. The selection of the particular device may be indicated on the screen 620 in any way generally known to those of skill in the art. Additionally, the screen 620 may, upon selection of one of the devices 630-664, display additional information about the selected device (e.g., device status, active alarms, the current assignment of the device, etc.), such as in an area 670 of the screen 620.

Figure 10A:
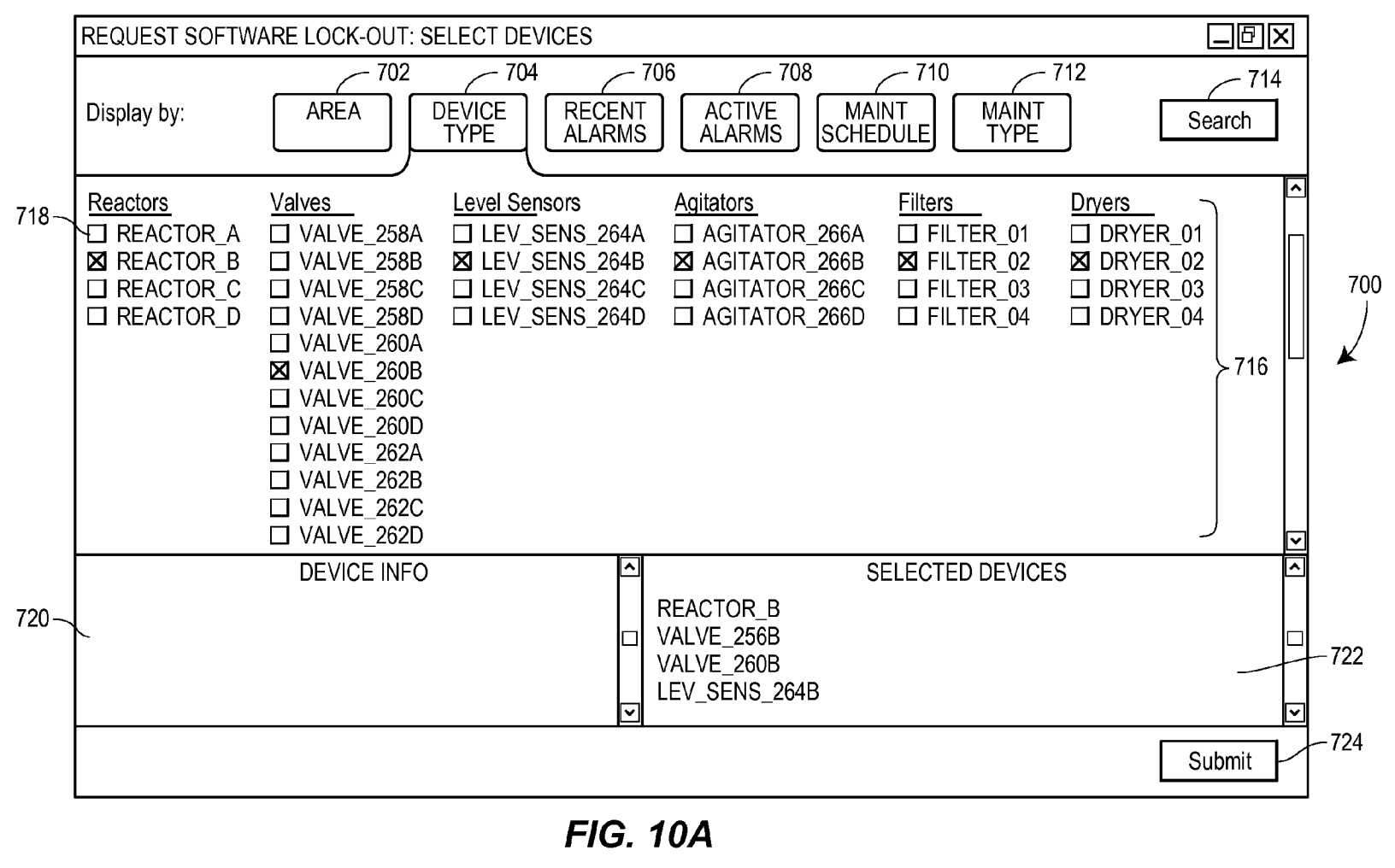

FIG. 10A illustrates an alternative embodiment of a device selection screen 700 that the AMS 210 may display to a technician to allow the technician to select one or more devices to which to request access. As illustrated in FIG. 10A, the screen 700 may include one or more tabs or buttons 702-712 for selecting an organization method for the devices. Upon selection of one of the tabs 702-712, the screen 700 may display a list 716 of the devices from which the technician can choose using any known selection method, such as check boxes 718, radio buttons, etc. The list may be organized in any convenient manner (e.g., by area, by device type, by active or recent alarms, by maintenance schedule, by maintenance type, by physical proximity, etc.). For example, selecting the tab or button 702 may cause the screen 700 to display the available devices by area of the process plant, while selecting the tab or button 704 may cause the screen 700 to display the available devices by device type, as illustrated in FIG. 10A. Activating the tabs or buttons 706, 708, 710, or 712 may cause the screen 700 to display the available devices by recent alarm status, by active alarm status, by maintenance schedule, or by maintenance type, respectively. The screen 700 may also provide a button 714 for allowing the technician to search and/or filter the devices. A portion 720 of the screen 700 may be display information about a selected device, for example, when the technician selects the device by clicking on the device name 719. A separate portion 722 of the screen 700 may likewise display a list of selected devices. Upon completing selection of the devices for which the technician wishes to request access, the technician may activate a button 724 to submit the request.

Figure 10B:
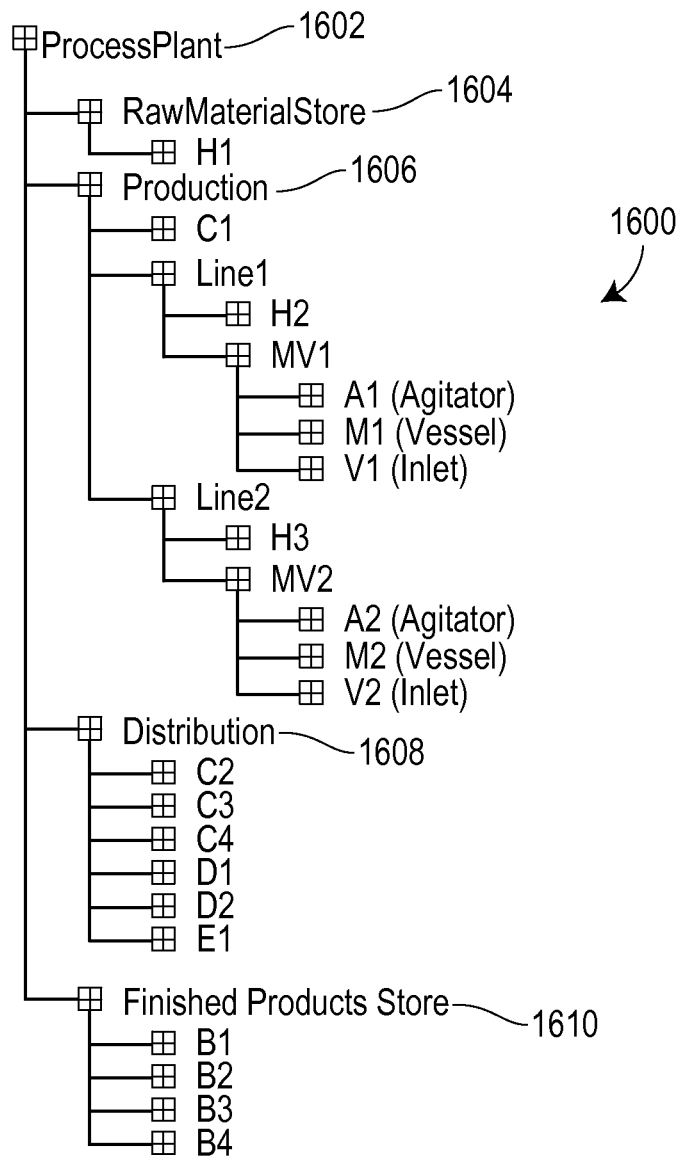
FIG. 10B depicts another alternate exemplary device selection screen for use in a software lockout coordination system.

The selection screen and organization of devices need not be as illustrated in either of FIGS. 9 and 10A. For example, the selection screen may be a device organization tree having a hierarchy of devices organized by logical unit within the process plant, such as that shown in FIG. 10B, or may be any other type of selection screen that allows a technician to select one or more devices for which to request access from a process operator.

After the maintenance technician selects the device or devices for which to request control for maintenance, the AMS 210 may, in some embodiments, display a screen of secondary information, such as the screen 750 illustrated in FIG. 11. The screen 750 may display additional information about the selected devices. For example, the screen 750 may display a list 752 of the selected devices, as well as relevant information for each device including, by way of example and not limitation, associated devices 754, the scheduled maintenance type 756, the type of access requested 758, the current device state 760, recent alarms related to the device 762, required and/or scheduled periodic maintenance 764, a maintenance history for the device, etc. Some of the information displayed on the screen 750 may, instead of displaying known information, comprise a means for allowing the technician to provide additional information about the request including, but not limited to, means 770 for inputting type of maintenance the technician plans to perform 756, means for inputting the expected duration of the maintenance activities, means 772 for inputting the type (e.g., the level) of access the technician is requesting 758, etc. The inputs may be text boxes, pull-down menus, etc., as is generally known. Moreover, as described above with reference to FIG. 7, the lockout coordination system may, in some embodiments, automatically determine other devices or sets of devices that should be assigned to maintenance (or to the requesting technician), and the AMS 210 and, in particular, the screen 750, may display the associated devices 754. As also described above, the associated devices or sets of devices may be automatically selected dependent on the type of maintenance that the technician is to perform. However, the screen 750 may also, in some embodiments, display means 768 for allowing the technician to select one or more sets of devices which should be associated with each selected device. Once again, a button 774 may allow the technician to submit the request.

Figure 12:
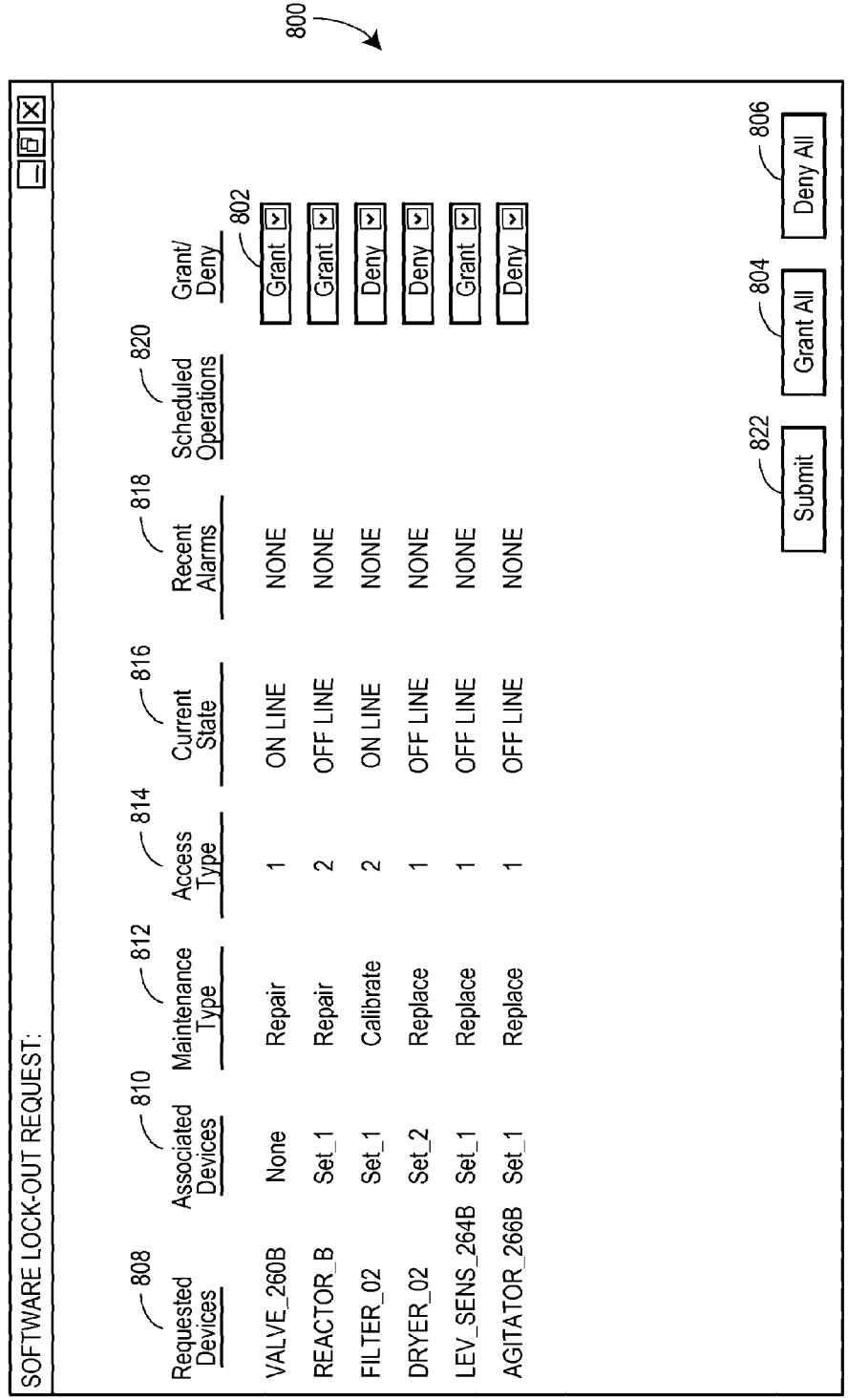
FIG. 12 depicts an exemplary request screen for displaying to a process operator one or more devices requested by a user of an asset management system.

After the technician submits the selection of the device or devices (and, in some embodiments, views and/or submits the secondary information), the AMS 210 transmits a request for the selected resource or resources from the workstation 204 running the AMS 210 to the workstation 202 of the operator currently controlling the area in which the process control device is located. If the technician selects multiple devices, the selected devices may be controlled by different operators, which operators may be working at different workstations. Thus, for a group of devices selected by a technician, the AMS 210 may transmit a request for a first sub-set of the selected devices to a first operator workstation and may transmit a request for a second sub-set of the selected devices to a second operator workstation. In any event, the operator's workstation 202 receives the request and displays the request for the one or more devices to the operator. FIG. 12 illustrates an exemplary screen 800 displaying a request for a group of requested devices. In addition to providing means 802 (e.g., providing buttons, radio buttons, check boxes, yes/no or grant/deny pull-down menus, etc.) for individually granting and/or denying the request for each of the requested devices or sets of devices listed in a column 808, the screen 800 may also display a "grant all" button 804 and a "deny all" button 806, which buttons allow the operator to grant or deny the entire group of requests. Moreover, the screen 800 may include, in some embodiments, additional information about the process control device or devices for which control is requested by the technician. Without limitation, the additional information may include information in a column 816 indicating whether the device is currently in use by a process, information in a column 820 indicating whether the device is reserved for future use by a process, information in a column 816 indicating the current state of the device, information in a column 812 indicating the type of maintenance is scheduled for the device, information in a column 818 indicating any alarms or other maintenance requests that have been generated for or by the device, the technician requesting access to the device, information in a column 814 indicating the type (e.g., what level) of access the technician is requesting, information in a column 810 indicating which devices are associated with each other and/or how the devices are associated, etc. The request screen 800 displayed on the operator's workstation could also display the requested devices on a pictorial depiction of the process plant similar to the depiction in FIG. 9. The screen 800 may also provide means (e.g., pull-down menus, etc.) for modifying information where, for example, the technician requests one level of access to a device and the operator wishes to grant a different level of access to the device. A button 822 may allow the operator to submit the grant/deny decisions and any changes made to the access parameters.

For each selected device for which the operator grants the request for control of the device, the system may change the assignment record associated with the device to indicate that control of the device is assigned to the maintenance technician. The system may further indicate to the maintenance technician (e.g., by displaying a notification (not shown) on the display of the technician's workstation) that the operator granted the request and that the maintenance technician may proceed to perform maintenance operations. In some embodiments, the system may also display to the maintenance technician what types of maintenance operations the technician may perform, the access level granted to the technician, the current status of the device, a list of scheduled maintenance for the device, recent or current alarms or other maintenance requests that have been generated for or by the device, etc.

Upon the maintenance technician's completion of maintenance operations on the device, the maintenance technician can alert the operator that the technician is prepared to return responsibility/control of the device to the operator. For example, the maintenance technician may activate a control on the AMS 210 (e.g., by clicking on a button on the display of the workstation 204) to allow the technician to select one or more devices for which to return control to the operator. The AMS 210 may then allow the technician to select one or more devices for which to return control. The method of selecting devices for which to return control may be the same as that used to select devices for which to request control. That is, the technician may select from a list of device tags or a group of device icons for which control is assigned to the technician, a device for which the technician wants to relinquish control. The AMS 210 transmits a notification to the operator workstation 202 for display to the operator. The operator's workstation 202 displays the notification to the operator, and allows the operator to acknowledge the notification. The notification may include additional information about the process control device for which the maintenance technician seeks to relinquish control. Without limitation, the additional information may include what maintenance tasks the technician performed on the device, the current state of the device, how long control of the device was assigned to the maintenance technician, etc. Upon acknowledgement of the notification by the operator, the system may change the assignment record to indicate that control of the device is assigned to the operator, and the maintenance technician is again prevented from making changes to the device (i.e., the technician may again be "locked out"). The system may also provide notification of the acknowledgement to the maintenance technician.

In some embodiments, the operator can determine, from the host process control system 11 (i.e., from the operator's workstation 202), all of the process control devices normally in the span of the operator's control that are turned over to the maintenance technician. In fact, in some embodiments, such as those for which devices are assigned to (or "checked-out" by) specific maintenance technicians, the operator can determine which maintenance technician is responsible for any device turned over to a maintenance technician. Likewise, from the AMS 210, the maintenance technician logged into a workstation can determine all of the devices currently under the technician's responsibility, so that no devices are left out of the operator's control unintentionally upon the completion of maintenance. These status displays may take any form capable of conveying the desired information. In some embodiments, the status displays take the form of a pictorial diagram of the process plant (or an area of the process plant). In a pictorial depiction of the process plant, individual devices may indicate that a device is "tagged out" by a technician by, for example, highlighting the device in red, displaying an icon such as a tag or other visual indicator, etc. Additional information (e.g., the technician to whom a device is assigned, the current status of the device, etc.) may also be conveyed to the operator and/or technician by hovering over the depiction of the device. All of the same information may be conveyed in a tabular format as well.

The embodiments described thus far contemplate that a change in the status of a device from being assigned to an operator to being assigned to a maintenance technician (i.e., a change to an assignment record) is accomplished through a request and grant process between the operator and the technician, in some embodiments, it may be appropriate to implement certain event triggers for changing an assignment record for one or more devices to indicate that a device is assigned to maintenance. Thus, in some embodiments, one or more alarm conditions associated with a device may trigger a change in the assignment record for the device. This could be accomplished by any number of methods. For example, the alarm may be generated by the AMS 210 which, in turn, requests assignment of the device from the DCS 11, and the DCS 11 may be programmed to automatically grant requests associated with the alarm. Alternatively, the AMS 210 may have access to the assignment record table (e.g., the table 400) to make a change to the appropriate assignment record (e.g., the record 422). As another alternative, the alarm may be generated by the device, and the PTMH routine 234 may automatically modify the assignment record table upon parsing and retransmitting the alarm (e.g., to the AMS 210 or the DCS 11). As yet another alternative, the DCS 11 may, upon receiving an alarm indication, modify the assignment record table to assign the device to maintenance.

Thus, while the present disclosure describes specific embodiments intended to be illustrative only, and not limiting, it will be apparent to those of ordinary skill in the art that changes, additions, or deletions may be made to the disclosed embodiments without departing from the spirit and scope of the disclosure. Moreover, it is explicitly contemplated that each of the individual features described with reference to the various embodiments disclosed may be combined with any of the other features disclosed herein. Thus, the intention is to cover all modifications, alternative constructions, and equivalents falling within the spirit and scope of the disclosure as defined by the appended claims.

We claim:

1. A process control system operating to control a process within a process plant, the system comprising:
   a process control equipment resource;
   a process controller;
   a plurality of user interface devices including an operator user interface device and a maintenance user interface device, each of the plurality of user interface devices including a processor and a display;
   a data structure storing an assignment record for identifying an assigned user interface device for the process control equipment resource, the assigned user interface device for the process control equipment resource being one of the operator user interface device or the maintenance user interface device; and
   a message handling routine that, when executed, causes the process controller to to selectively forward or block messages to the process control equipment resource based on (i) which of the plurality of user interface devices is sending the messages and (ii) which of the plurality of user interface devices the assignment record indicates is the assigned user device for the process control equipment resource, such that a message sent to the process control equipment resource is blocked:
   (a) when the message is sent from the operator user interface device while the assigned user interface device is the maintenance user interface device; and
   (b) when the message is sent from the maintenance user interface device while the assigned user interface device is the operator user interface device.

2. The process control system of claim 1, wherein the assignment record comprises a device identification and a value indicating whether the maintenance user interface device may access the process control equipment resource.

3. The process control system of claim 2, wherein the assignment record further comprises a value indicating one or more specific persons having access to the process control equipment resource.

4. The process control system of claim 2, wherein the assignment record further comprises a value indicating an access level for the process control equipment resource.

5. The process control system of claim 1, wherein the data structure comprises a plurality of registers, stored on a computer readable storage device, each register operable to indicate for the process control equipment resource whether each of the operator user interface device and the maintenance user interface device may access the process control equipment resource.

6. The process control system of claim 1, further comprising:
   a first display routine operable to cause a first display device coupled to the operator user interface device to display a first list of process control equipment resources accessible to the maintenance user interface device; and
   a second display routine operable to cause a second display device coupled to the maintenance user interface device to display a second list of process control equipment resources accessible to the maintenance user interface device, and
   wherein the first and second lists are generated or updated according to the data structure.

7. The process control system of claim 1, further comprising a batch executive engine operable to schedule one or more batches and to allocate process control equipment resources for each batch, the batch executive engine communicatively coupled to the data structure and allocating the process control equipment resources according to the assignment record stored in the data structure.

8. The process control system of claim 7, wherein the batch executive engine reallocates process control equipment resources for a scheduled batch if the assignment record stored in the data structure indicates that one or more assigned process control equipment resources becomes inaccessible to the operator user interface device.

9. The process control system of claim 1, wherein accessing the process control equipment resource includes one or more of: sending a message to the resource, receiving a message from the resource, causing an operation on the resource, operating the resource, and changing the status of the resource.

10. A non-transitory computer readable storage medium having stored thereon one or more sets of computer readable instructions for execution by one or more processors, the instructions, when executed by the one or more processors, causing the one or more processors to: display at a first user interface device an operator user interface operable to control a process control equipment resource operating as part of a process that operates in a process plant, the first user interface device including a processor and a display; display at a second user interface device a maintenance user interface operable to perform tasks related to maintaining the process control equipment resource, the second user interface device including a processor and a display; maintain an assignment record for the process control equipment resource; display a third user interface configured to facilitate selection by a user of the first user interface device or the second user interface device to be an assigned user interface device for the process control equipment resource and which causes the assignment record to be changed to indicate that the selection from the first user interface device and the second user interface device is the assigned user interface device for the process control equipment resource; and selectively facilitate communication, by a process controller, between the process control equipment resource and one of the first and second user interface devices based on (i) which of the first and second user interface devices is sending the message and (ii) which of the first and second user interface devices the assignment record indicates is the assigned user interface device for the process control equipment resource, such that a message sent to the process control equipment resource is blocked: (a) when the message is sent from the first user interface device while the assigned user interface device is the second user interface device; and (b) when the message is sent from the second user interface device while the assigned user interface device is the first user interface device.

11. The non-transitory computer readable storage medium of claim 10, further comprising instructions operable to cause the one or more processors to allow a user of the second user interface device to modify the assignment record.

12. The non-transitory computer readable storage medium of claim 10, further comprising instructions operable to cause the one or more processors to allow a user of the first user interface device to review a request from a user of the second user interface device and to grant or deny the request.

13. The non-transitory computer readable storage medium of claim 10, further comprising instructions operable to cause the one or more processors to: display via the second user interface device the process control equipment resource; receive via the second user interface device a selection of the process control equipment resource to request access; display via the first user interface device the selected process equipment control resource; receive via the first user interface device a decision granting or denying the requested access; and selectively modify the assignment record based on whether the requested access was granted or denied.

14. The non-transitory computer readable storage medium of claim 10, further comprising instructions operable to cause the one or more processors to: display via the second user interface device the process control equipment resource; receive via the second user interface device a selection of the process control equipment resource to request access; and selectively modify the assignment record based on the requested access.

15. A method for selectively facilitating control access by first and second users to a process control equipment resource operating in a process of a process plant, the method comprising:
- facilitating selection of the process control equipment resource, by a first user, to be assigned to the first user and, in response to the selection, notifying a second user that the process control equipment resource is assigned to the first user;
- storing user access information indicative of which of the first and second users may control the process control equipment resource, the first user associated with a maintenance function and the second user associated with an operator function;
- retrieving the stored user access information for the process control equipment resource;
- evaluating the retrieved user access information to determine a one of the first and second users to whom the process control equipment resource is accessible; and
- selectively facilitating control access, via a process controller, to the process control equipment resource by either the first or the second user according to the evaluation of the retrieved user access information, wherein (i) control access by the first user precludes control access by the second user, and (ii) control access by the second user precludes control access by the first user, such that a message to the process control equipment resource is blocked:
  - (a) when the message is sent from a user interface device used by the first user while the user access information does not indicate that the first user may control the process control equipment resource; and
  - (b) when the message is sent from a user interface device used by the second user while the user access information does not indicate that the second user may control the process control equipment resource.

16. The method of claim 15, further comprising:
receiving from the first user a request to access the process control equipment resource;
displaying to the second user the request to access the process control equipment resource;
receiving from the second user a selection granting or denying the request; and
selectively modifying the stored user access information according the selection received from the second user.

17. The method of claim 16, further comprising:
receiving from the first user a request to transfer control access to the process control equipment resource back to the second user;
displaying to the second user the request to transfer control access back to the second user;
receiving from the second user an acknowledgement; and
selectively modifying the stored user access information according to the request and acknowledgement.

18. The method of claim 15, wherein the stored user access information includes an indication of the control access to provide to the selected user.

19. A method for selectively facilitating control access by first and second users to a process control equipment resource operating in a process of a process plant, the method comprising:
- facilitating selection of the process control equipment resource, by a first user, to be assigned to the first user and, in response to the selection, notifying a second user that the process control equipment resource is assigned to the first user;
- storing user access information indicative of which of the first and second users may control the process control equipment resource, the first user associated with a maintenance function and the second user associated with a operator function;
- retrieving the stored user access information for the process control equipment resource;
- evaluating the retrieved user access information to determine a one of the first and second users to whom the process control equipment resource is accessible; and
- selectively facilitating control access to the process control equipment resource by either the first or the second user according to the evaluation of the retrieved user access information, wherein (i) control access by the first user precludes control access by the second user, and (ii) control access by the second user precludes control access by the first user;
- the method further comprising:
  - (i) receiving from the first user a request to access the process control equipment resource;
  - (ii) displaying to the second user the request to access the process control equipment resource;
  - (iii) receiving from the second user a selection granting or denying the request; and
  - (iv) selectively modifying the stored user access information according the selection received from the second user;
- the method further comprising:
  - (i) receiving from the first user a request to transfer control access to the process control equipment resource back to the second user;
  - (ii) displaying to the second user the request to transfer control access back to the second user;
  - (iii) receiving from the second user an acknowledgement; and
  - (iv) selectively modifying the stored user access information according to the request and acknowledgement.

* * * * *